US012550203B2

(12) United States Patent
Shin et al.

(10) Patent No.: US 12,550,203 B2
(45) Date of Patent: Feb. 10, 2026

(54) METHOD FOR TRANSMITTING AND RECEIVING DATA IN WIRELESS COMMUNICATION SYSTEM SUPPORTING FULL DUPLEX COMMUNICATION, AND APPARATUS THEREFOR

(71) Applicant: LG ELECTRONICS INC., Seoul (KR)

(72) Inventors: Dongsoo Shin, Seoul (KR); Woochan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 18/013,869

(22) PCT Filed: Jun. 30, 2020

(86) PCT No.: PCT/KR2020/008497
§ 371 (c)(1),
(2) Date: Dec. 29, 2022

(87) PCT Pub. No.: WO2022/004903
PCT Pub. Date: Jan. 6, 2022

(65) Prior Publication Data
US 2023/0300906 A1    Sep. 21, 2023

(51) Int. Cl.
*H04W 76/10* (2018.01)
*H04L 5/14* (2006.01)
*H04W 48/08* (2009.01)

(52) U.S. Cl.
CPC ............. *H04W 76/10* (2018.02); *H04L 5/14* (2013.01); *H04W 48/08* (2013.01); *H04L 5/1438* (2013.01)

(58) Field of Classification Search
CPC ..... H04W 76/00; H04W 76/10; H04W 48/00; H04W 48/08; H04W 7/20; H04W 7/231; H04L 5/00; H04L 5/14; H04L 5/1438
See application file for complete search history.

(56) References Cited

U.S. PATENT DOCUMENTS

| 2006/0172754 | A1* | 8/2006 | Shin | H04W 4/10 |
| | | | | 455/518 |
| 2013/0128782 | A1* | 5/2013 | Boixadera | H04L 5/16 |
| | | | | 370/281 |

(Continued)

FOREIGN PATENT DOCUMENTS

| EP | 2339882 A1 * | 6/2011 | ............ H04W 48/08 |
| KR | 10-2019-0069373 | 6/2019 | |
| WO | 2019139195 | 7/2019 | |

OTHER PUBLICATIONS

PCT International Application No. PCT/KR2020/008497, Written Opinion of the International Searching Authority dated Mar. 23, 2021, 10 pages.

*Primary Examiner* — Warner Wong
(74) *Attorney, Agent, or Firm* — LEE, HONG, DEGERMAN, KANG & WAIMEY

(57) ABSTRACT

The present document discloses a method for transmitting and receiving data by user equipment in a wireless communication system, the method comprising the steps of: receiving a master information block (MIB) from a base station; transmitting a radio resource control (RRC) connection request to the base station on the basis of the MIB; and receiving, from the base station, a response to the RRC connection request, wherein the MIB includes information about one or more duplex modes supportable by the base station, and the RRC connection request includes information about a duplex mode supportable by the user equipment.

13 Claims, 24 Drawing Sheets

(56) References Cited

U.S. PATENT DOCUMENTS

| | | | |
|---|---|---|---|
| 2016/0323088 A1* | 11/2016 | Beale | H04L 5/1438 |
| 2016/0345118 A1* | 11/2016 | Oh | H04B 1/713 |
| 2019/0260567 A1 | 8/2019 | Pak et al. | |
| 2023/0053250 A1* | 2/2023 | Kim | H04L 5/00 |
| 2023/0300906 A1* | 9/2023 | Shin | H04W 76/10 |
| | | | 370/277 |

* cited by examiner (a)

(b)

METHOD FOR TRANSMITTING AND RECEIVING DATA IN WIRELESS COMMUNICATION SYSTEM SUPPORTING FULL DUPLEX COMMUNICATION, AND APPARATUS THEREFOR

CROSS-REFERENCE TO RELATED APPLICATION(S)

This application is the National Stage filing under 35 U.S.C. 371 of International Application No. PCT/KR2020/008497, filed on Jun. 30, 2020, the contents of which are all incorporated by reference herein in their entirety.

TECHNICAL FIELD

The present disclosure relates to a method of transmitting and receiving data related to a duplex mode in in a wireless communication system supportive of various duplex modes and apparatus for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between User Equipment (UE), and voice or data is directly exchanged between terminals without going through a base station (BS). SL is being considered as one way to solve the burden of the base station due to the rapidly increasing data traffic.

Also, the UE or vehicle may receive resource allocation for an uplink signal and a resource allocation for a downlink signal from the base station. The UE or vehicle may be allocated resources for the uplink signal from the base station through uplink control information (UCI), or may receive resources for the downlink signal from the base station through uplink control information (DCI).

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

SUMMARY

One technical task of the present disclosure is to provide a method of rapidly performing cell search by selecting a base station that supports a duplex mode matching UE's own service using information on a duplex mode provided by the base station when searching cells.

It will be appreciated by persons skilled in the art that the objects that could be achieved with the present disclosure are not limited to what has been particularly described hereinabove and the above and other objects that the present disclosure could achieve will be more clearly understood from the following detailed description.

In one technical aspect of the present disclosure, provided is a method of transmitting and receiving data by a user equipment in a wireless communication system, the method including receiving a Master Information Block (MIB) from a base station, transmitting a Radio Resource Control (RRC) connection request to the base station based on the MIB, and receiving a response to the RRC connection request from the base station, wherein the MIB may include information on one or more duplex modes supportable by the base station and wherein the RRC connection request may include information on a duplex mode supportable by the user equipment.

The information on the one or more duplex modes supported by the base station may be in a bitmap format.

The bitmap format may include 1 bit indicating one of a Half Duplex (HD) mode and a Full Duplex (FD) mode and 2 bits indicating one of a Frequency Division Duplex (FDD) mode, a Time Division Duplex (TDD) mode, a Space Division Duplex (SDD) mode, and a reserved mode.

The bitmap format may include 5 bits corresponding to Half Duplex-Frequency Division Duplex (HD-FDD), Half Duplex-Time Division Duplex (HD-TDD), Full Duplex-Frequency Division Duplex (FD-FDD), Full Duplex-Time Division Duplex (FD-TDD), and Full Duplex-Spacing Division Duplex (FD-SDD), respectively.

The method may further include determining whether the duplex mode supportably by the user equipment exists in the one or more duplex modes supported by the base station based on the MIB, wherein based on a case that the duplex mode supportably by the user equipment exists, the response to the RRC connection request may be an RRC connection reject and wherein based on a case that the duplex mode supportably by the user equipment fails to exist, the response to the RRC connection request may be an RRC connection setup.

The RRC connection reject may include information on another base station different from the base station.

The method may further include performing a cell search based on the information on the another base station.

The method may include attempting the cell search again after changing the duplex mode of the user equipment or waiting for a specific time.

In another technical aspect of the present disclosure, provided is a user equipment transmitting and receiving data in a wireless communication system, the user equipment including a transceiver and a processor configured to receive a Master Information Block (MIB) from a base station, transmit a Radio Resource Control (RRC) connection request to the base station based on the MIB, and receive a response to the RRC connection request from the base station, wherein the MIB may include information on one or more duplex modes supportable by the base station and wherein the RRC connection request may include information on a duplex mode supportable by the user equipment.

In another technical aspect of the present disclosure, provided is a method of transmitting and receiving data by a base station in a wireless communication system, the method including transmitting a Master Information Block (MIB) to a user equipment, receiving a Radio Resource Control (RRC) connection request from the user equipment based on the MIB, and transmitting a response to the RRC connection request to the user equipment, wherein the MIB may include information on one or more duplex modes supportable by the base station and wherein the RRC connection request may include information on a duplex mode supportable by the user equipment.

In another technical aspect of the present disclosure, provided is a base station transmitting and receiving data in a wireless communication system, the base station including a transceiver and a processor configured to transmit a Master Information Block (MIB) to a user equipment, receive a Radio Resource Control (RRC) connection request from the user equipment based on the MIB, and transmit a response to the RRC connection request to the user equipment, wherein the MIB may include information on one or more duplex modes supportable by the base station and wherein the RRC connection request may include information on a duplex mode supportable by the user equipment.

In another technical aspect of the present disclosure, provided is an apparatus for a user equipment, the apparatus including at least one processor and at least one computer memory operably connected to the at least one processor and storing instructions enabling the at least one processor to perform operations when executed, the operations including receiving a Master Information Block (MIB) from a base station, transmitting a Radio Resource Control (RRC) connection request to the base station based on the MIB, and receiving a response to the RRC connection request from the base station, wherein the MIB may include information on one or more duplex modes supportable by the base station and wherein the RRC connection request may include information on a duplex mode supportable by the user equipment.

In further technical aspect of the present disclosure, provided is a computer-readable storage medium storing at least one computer program including an instruction enabling at least one processor to perform an operation for a user equipment when executed by the at least one processor, the operation including receiving a Master Information Block (MIB) from a base station, transmitting a Radio Resource Control (RRC) connection request to the base station based on the MIB, and receiving a response to the RRC connection request from the base station, wherein the MIB may include information on one or more duplex modes supportable by the base station and wherein the RRC connection request may include information on a duplex mode supportable by the user equipment.

In the present disclosure, a base station initially informs a UE of a duplex mode that can be serviced by the base station, and based on this information, the UE selects the base station to reduce unnecessary time, thereby providing an efficient service.

In addition, according to the present disclosure, if there is no base station that supports a duplex mode matching a UE itself, it is effective to reduce service delay by informing a base station of a supportable duplex mode of the UE.

The effects that can be achieved through the embodiments of the present disclosure are not limited to what has been particularly described hereinabove and other effects which are not described herein can be derived by those skilled in the art from the following detailed description.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
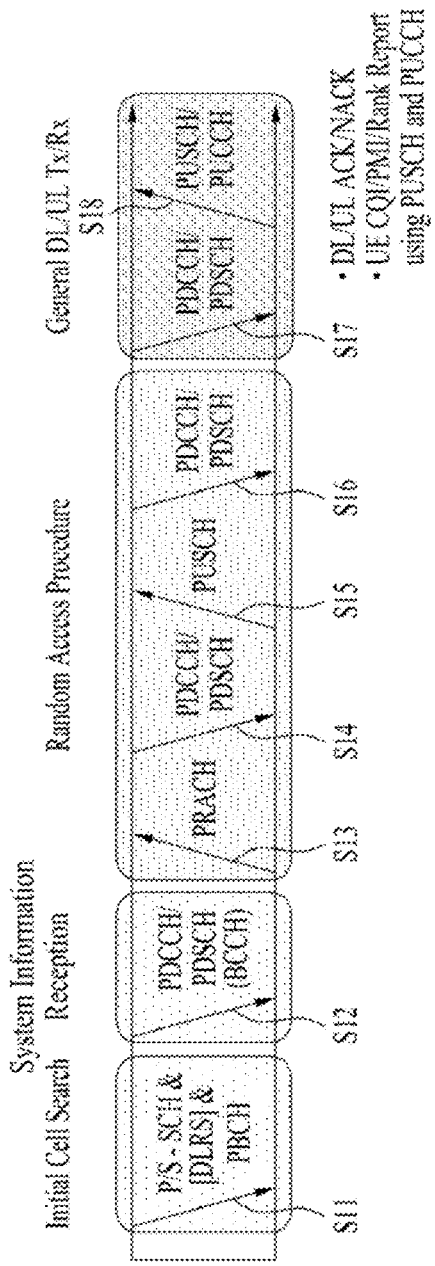
FIG. 1 illustrates physical channels and a general signal transmission method using the physical channels as an exemplary wireless communication system.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR can utilize all available spectrum resources, from low frequency bands below 1 GHz to intermediate frequency bands from 1 GHz to 10 GHz and high frequency (millimeter wave) bands above 24 GHz.

In order to clarify technical features of various embodiments of the present disclosure, various embodiments of the present disclosure are mainly described not only for the 3GPP LTE/LTE-A system but also for the 3GPP NR system, but can also be applied to the IEEE 802.16e/m system, etc.

In a wireless access system, a user equipment (UE) may receive information from a base station (BS) through downlink (DL) and may transmit information to the BS through uplink (UL). Transmission/reception (Tx/Rx) information between the UE and the BS may include general data information and various control information, and various physical channels may exist according to types/usages of the Tx/Rx information.

FIG. 1 illustrates physical channels and a general method for transmitting signals on the physical channels.

Referring to FIG. 1, when a UE is powered on or enters a new cell, the UE performs initial cell search (S11). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB.

Then, the UE may acquire information broadcast in the cell by receiving a physical broadcast channel (PBCH) from the eNB.

During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S12).

If the UE initially accesses the eNB or has no radio resources for signal transmission to the eNB, the UE may perform a random access procedure with the eNB (S13 to S16). In the random access procedure, the UE may transmit a predetermined sequence as a preamble on a physical random access channel (PRACH) (S13 and S15) and may receive a response message to the preamble on a PDCCH and a PDSCH associated with the PDCCH (S14 and S16). In the case of a contention-based RACH, the UE may additionally perform a contention resolution procedure.

On the other hand, when the random access process is performed in two steps, S13/S15 may be performed as one operation in which the UE performs data transmission, and S14/S16 may be performed as one operation in which the BS performs data transmission.

After the above procedure, the UE may receive a PDCCH and/or a PDSCH from the eNB (S17) and transmit a physical uplink shared channel (PUSCH) and/or a physical uplink control channel (PUCCH) to the eNB (S18), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
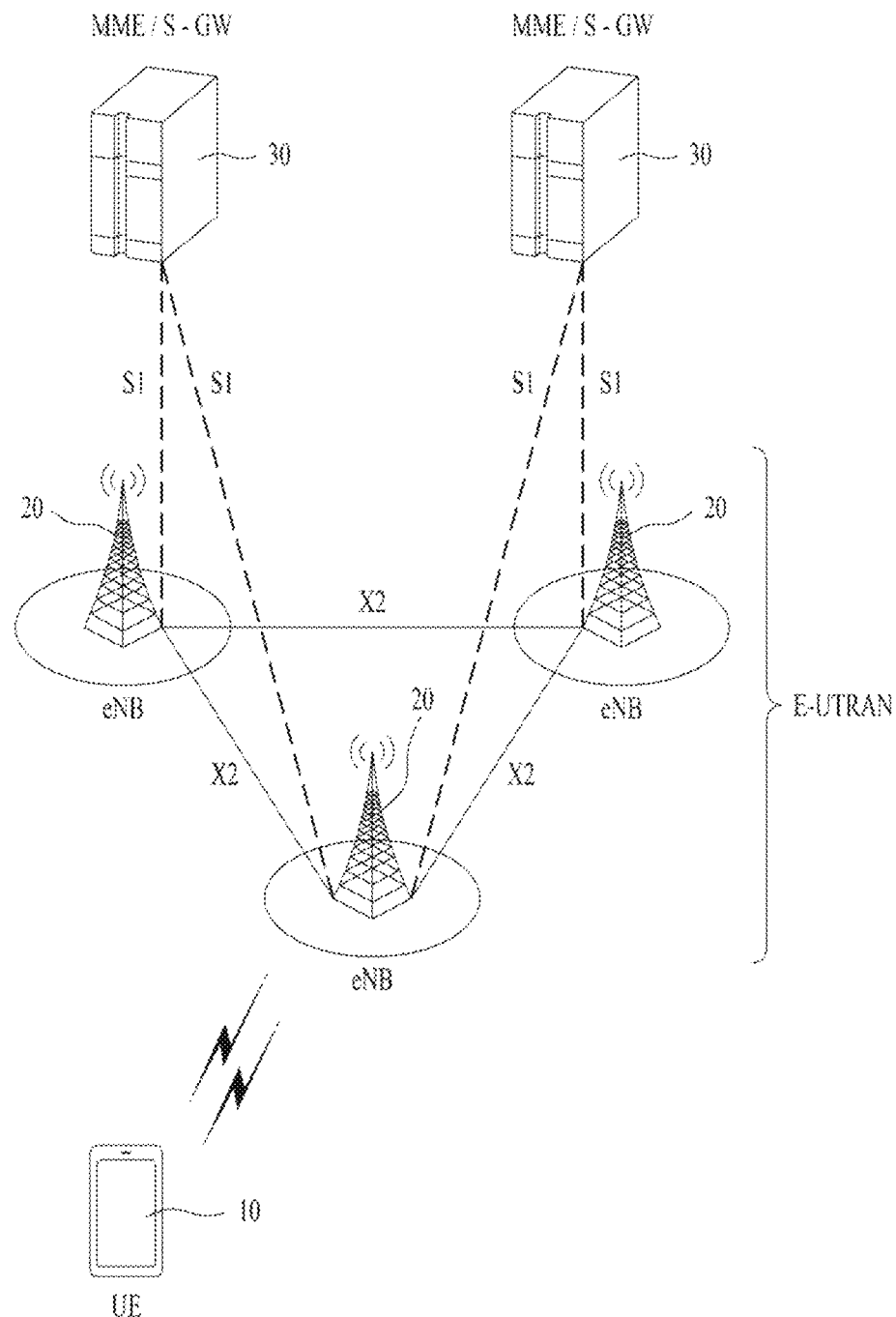
FIG. 2 illustrates the structure of an NR system to which embodiment(s) are applicable.

FIG. 2 illustrates the structure of a NR system to which the present disclosure is applicable.

Figure 4:
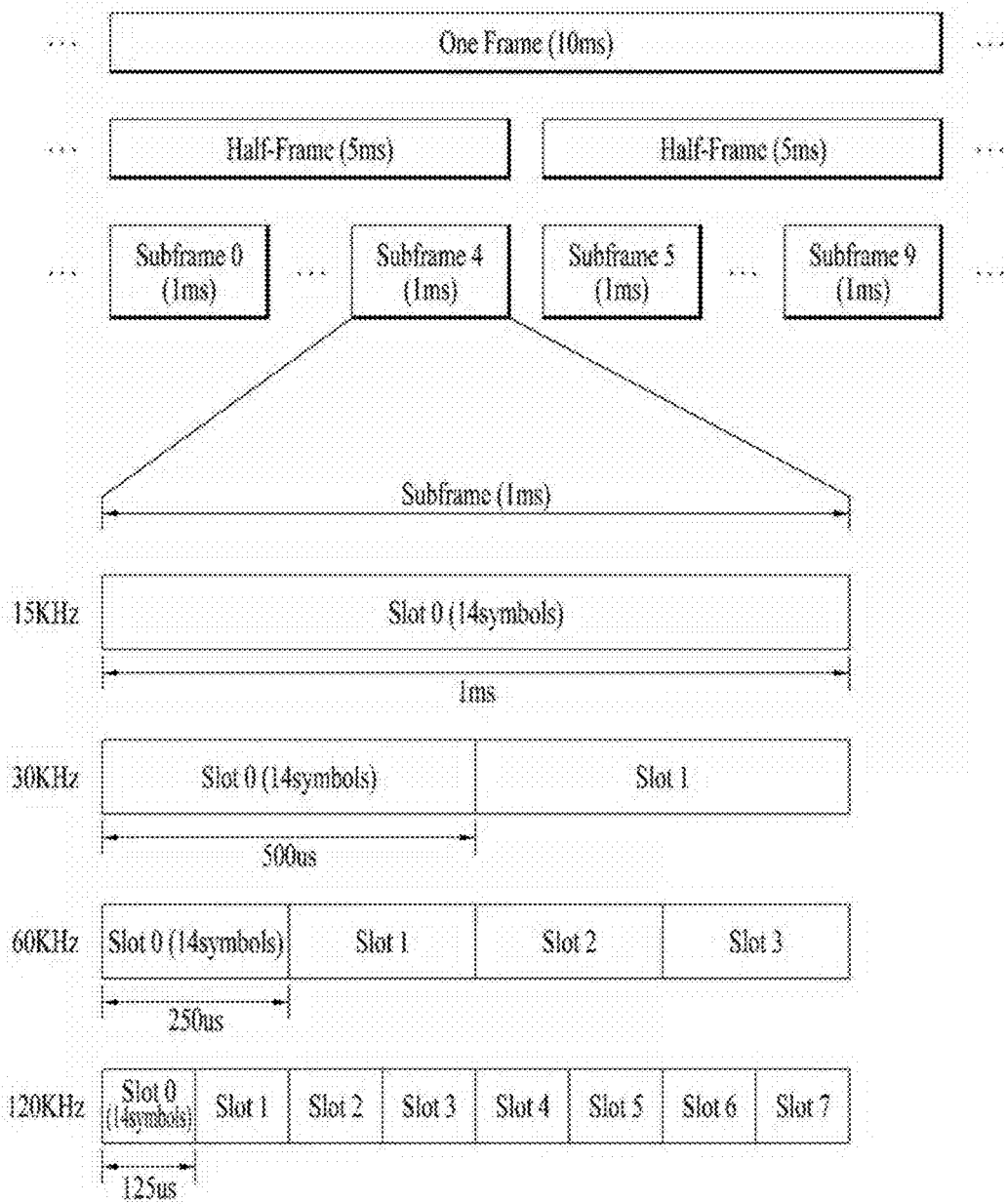
FIG. 4 illustrates the structure of an NR radio frame to which embodiment(s) are applicable.

Referring to FIG. 2, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
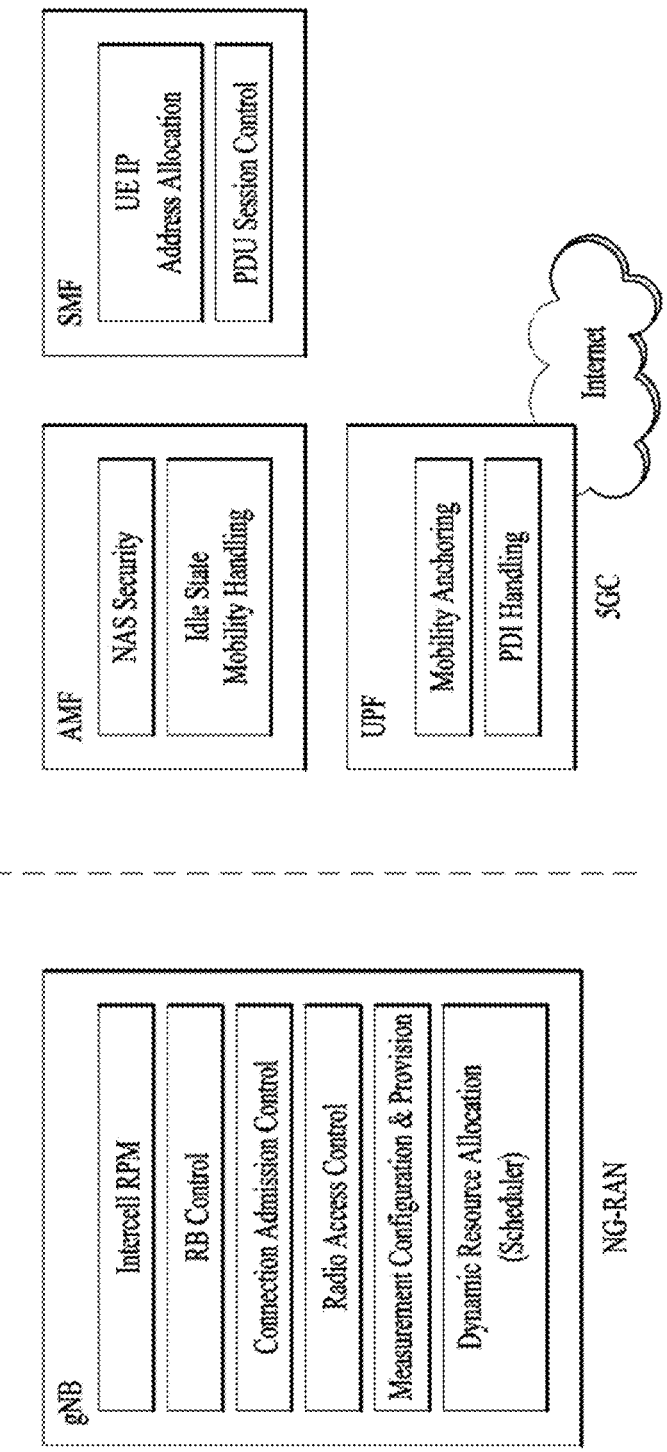
FIG. 3 illustrates functional split between an NG-RAN and a 5GC to which embodiment(s) are applicable.

FIG. 3 illustrates functional split between the NG-RAN and the 5GC to which the present disclosure is applicable.

Referring to FIG. 3, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM (A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration µ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM (A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz–7125 MHz | 15, 30, 60 kHz |
| FR2 | 24250 MHz–52600 MHz | 60, 120, 240 kHz |

Figure 5:
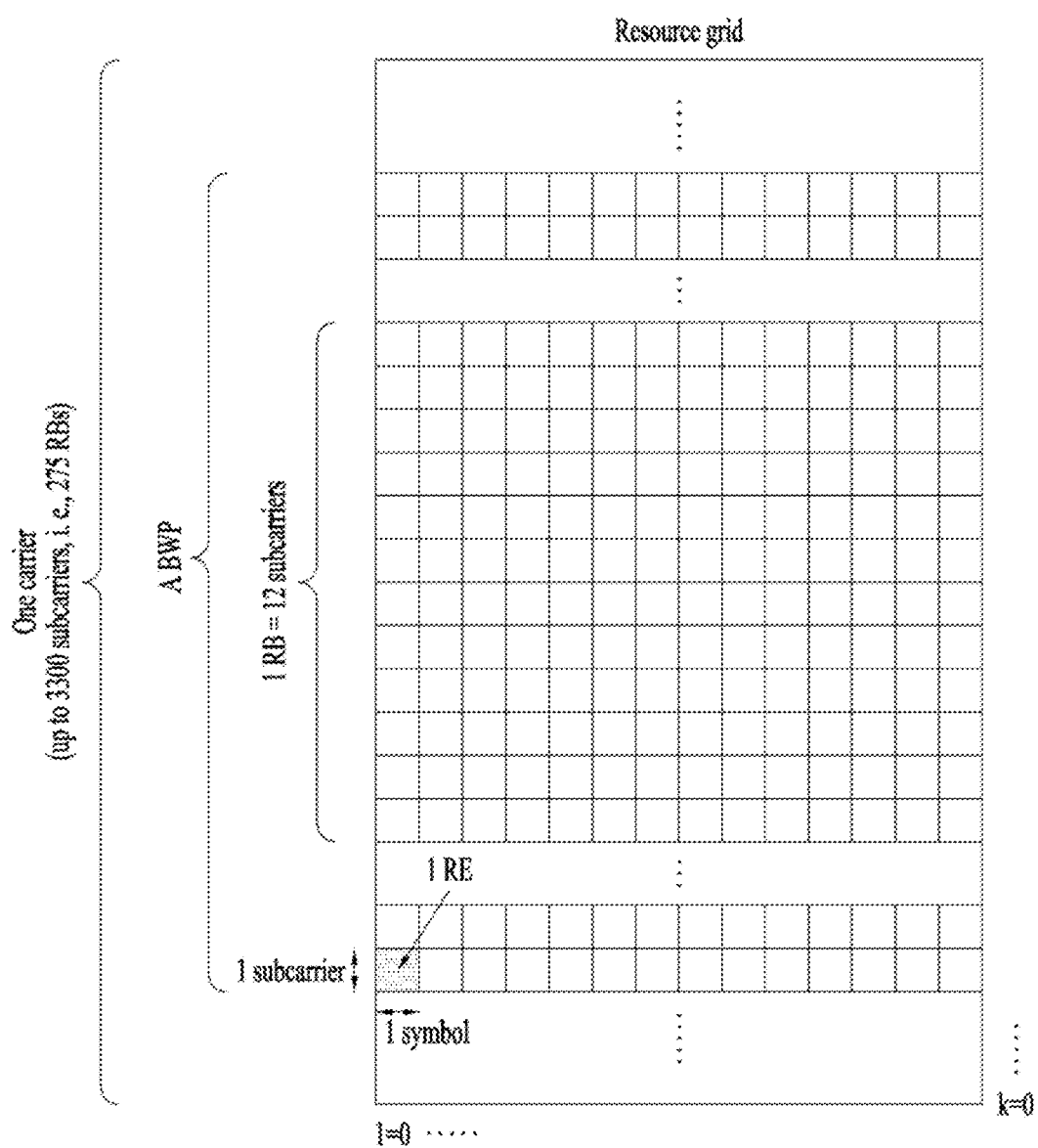
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P) RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
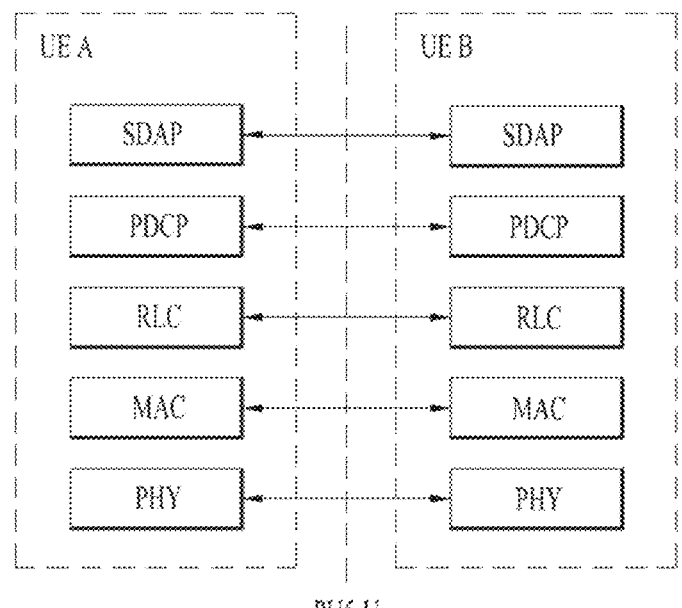
FIG. 6 illustrates a radio protocol architecture for SL communication.
Figure 6:
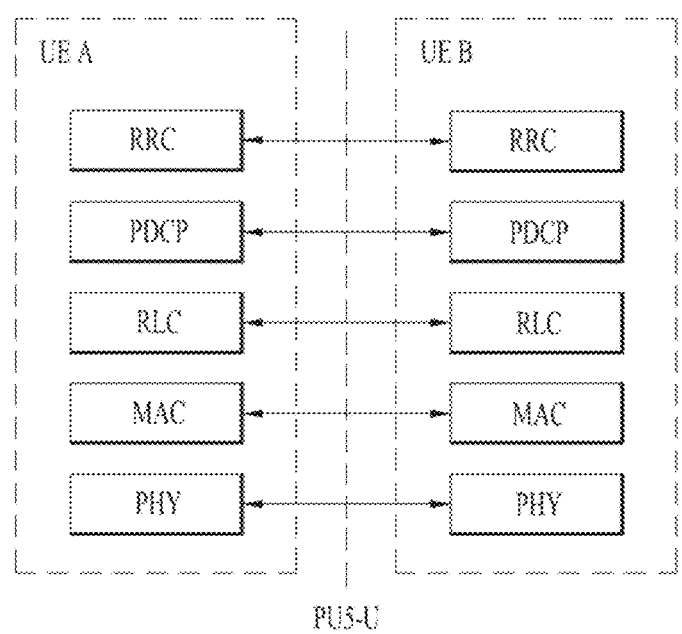

FIG. 6 illustrates a radio protocol architecture for SL communication. Specifically, FIG. 6-(a) shows a user plane protocol stack of NR, and FIG. 8-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre) set sidelink BWP (SL BWP). For example, the bandwidth of the S-SSB may be 11 resource blocks (RBs). For example, the PSBCH may span 11 RBs. The frequency position of the S-SSB may be (pre) set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
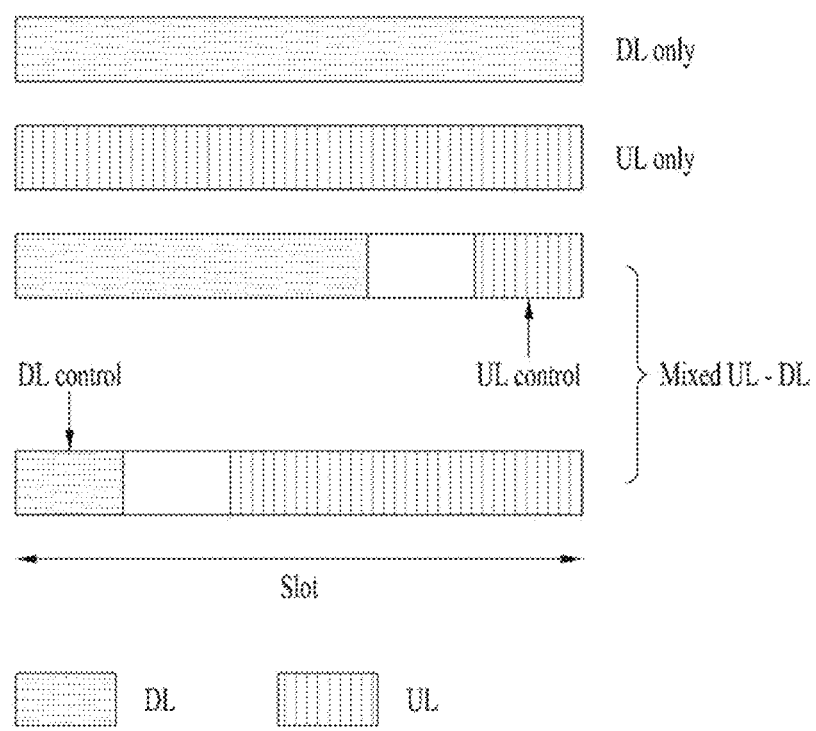
FIG. 7 illustrates a structure of a self-contained slot.

FIG. 7 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

Figure 8:
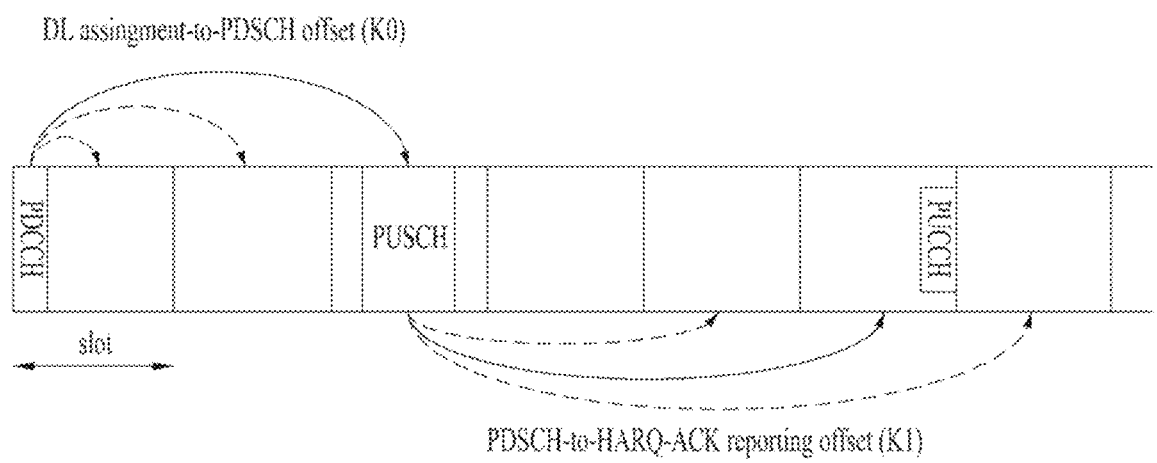
FIG. 8 illustrates an ACK/NACK transmission process.

FIG. 8 illustrates an ACK/NACK transmission process.

Referring to FIG. 8, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Overview of FDR System and Interference Factors in FDR

The FDR transmission/reception (Tx/Rx) system capable of simultaneously transmitting and receiving UL and DL signals on the same frequency band may perform frequency division or time division so that spectral efficiency of the FDR Tx/Rx system can be two times higher than the existing system. As a result, the FDR Tx/Rx system is spotlighted as one of the core technologies of the next generation 5G mobile communication system.

FDR configured to use a single frequency transmission band can be defined as a transmission resource configuration method that simultaneously performs data transmission/reception through a single frequency transmission band from the point of view of any wireless device. As a special example of FDR, wireless communication between a general BS (or a repeater, a relay node, a remote radio head (RRH), etc.) and a wireless UE can be expressed as a transmission (Tx) resource configuration method in which DL transmission and UL reception of the BS and DL reception and UL transmission of the wireless UE are simultaneously performed through a single frequency transmission band. As another example, in a device-to-device (D2D) direct communication situation between wireless UEs, FDR can also be expressed as a transmission resource configuration method in which transmission and reception of the wireless UEs are simultaneously performed in the same frequency transmission band. In the following disclosure, a general method for performing wireless communication between the BS and the wireless UE and FDR-related proposed technologies will be described, but the scope or spirit of the present disclosure is not limited thereto. Furthermore, the present disclosure may include an example of wireless communication with a network wireless device capable of wirelessly communicating with the UE other than the BS, and may further include D2D direct communication as needed.

Figure 9:
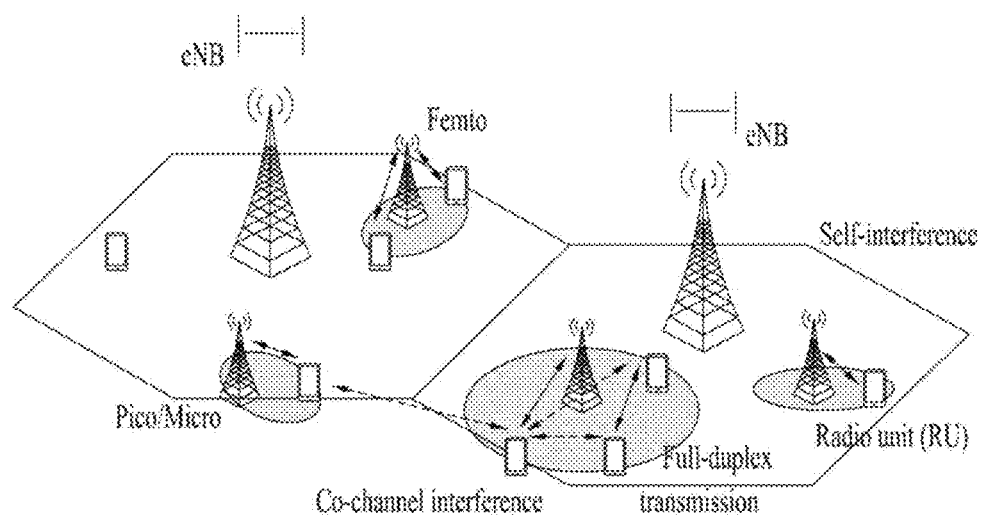
FIG. 9 shows the conceptual diagram of a user equipment and base station supportive of FDR.

FIG. 9 shows the conceptual diagram of a user equipment and base station supportive of FDR.

In the FDR situation shown in FIG. 9, total three types of interferences exist as follows.

Intra-device self-interference: As transmission and reception are performed with the same time and frequency resources, a signal transmitted by a device itself is simultaneously received as well as a desired signal. In this case, as the signal transmitted by the device itself barely has attenuation and is received by a Rx antenna of its own, it is received with power much greater than that of the desired signal, which means that it works as interference.

UE to UE inter-link interference: A UL signal transmitted by a UE is received by an adjacently located UE, thereby working as interference.

BS to BS inter-link interference: A signal transmitted between base stations or heterogeneous base stations (Picocell, femtocell, relay node) in HetNet situation is received by an Rx antenna of another base station, thereby working as interference.

Intra-device self-interference (hereinafter referred to as self-interference (SI)) among these three types of interference may be interference that occurs only in the FDR system and greatly degrades performance of the FDR system. Accordingly, in order to efficiently operate and manage the FDR system, the SI is the most serious problem to be solved first.

Figure 10:
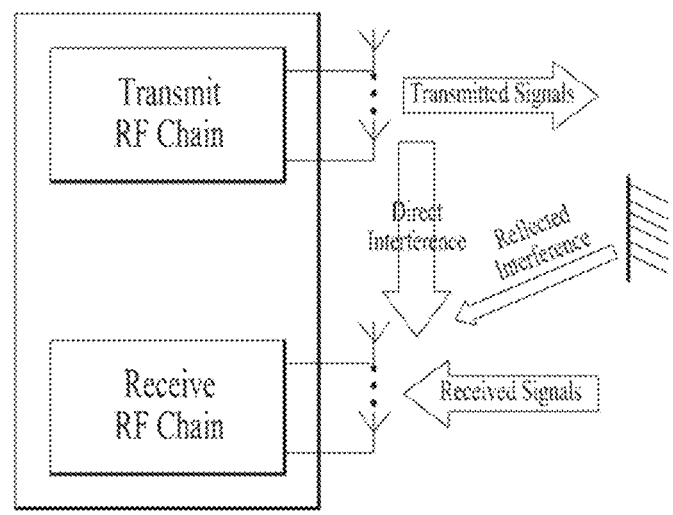
FIG. 10 is a conceptual diagram exemplarily showing Tx/Rx link and Self-Interference (SI) in FDR communication situation.

FIG. 10 is a conceptual diagram exemplarily showing Tx/Rx link and Self-Interference (SI) in FDR communication situation.

As shown in FIG. 10, Self-Interference (SI) may be categorized into direct interference that a signal transmitted from a Tx antenna directly enters an Rx antenna of its own without path attenuation and reflected interference that the signal is reflected by the surrounding terrain. And, a size of the SI is extremely larger than that of a desired signal due to a physical distance difference. Due to the intensity of the extremely large interference, effective cancellation of self-interference is required for the drive of FDR system.

In order to effectively drive the FDR system, requirements of Self-Interference Cancellation (Self-IC) according to maximum transmission power of a device may be determined as Table 5 (Self-IC requirements (BW=20 MHz) up FDR application in a mobile communication system).

TABLE 5

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB | −96 dBm | 142 dB |
| Pico eNB | 30 dBm | | (for eNB) | | 126 dB |
| Femto eNB, WLAN AP | 23 dBm | | | | 119 dB |
| UE | 23 dBm | | 9 dB (for UE) | −92 dBm | 115 dB |

Referring to Table 5, it can be observed that Self-IC performance of 119 dBm is necessary in order for a User Equipment (UE) to effectively drive an FDR system on a BandWidth (BW) of 20 MHz. A thermal noise value may change into $N_{0,BW}=-174$ dBm+$10 \times \log_{10}$ (BW) depending on a bandwidth of a mobile communication system, and Table 7 was found on the assumption of a bandwidth of 20

MHz. Regarding Table 7, Receiver Noise Figure (NF) considers a worst case by referring to 3GPP specification requirements. A receiver thermal noise level is determined as a sum of thermal noise and receiver NF on a specific BW.

Types of Self-Interference Cancellation (Self-IC) Schemes and Application Methods FIG. 10 is a diagram showing positions for applying there kinds of interference schemes in an RF Tx/Rx stage (or RF front stage) of a device. In FIG. 10, application positions of three kinds of Self-IC schemes are illustrated. Hereinafter, the three kinds of Self-IC schemes are schematically described.

Antenna Self-IC: a Self-IC scheme supposed to be executed most preferentially among all Self-IC schemes is an antenna Self-IC scheme. SI cancellation is performed in an antenna stage. Most simply, a portion of an SI signal can be cancelled in a manner of physically cutting off a transfer of the SI signal by installing an object capable of cutting off a signal between a Tx antenna and an Rx antenna, artificially adjusting an inter-antenna distance by utilizing multiple antennas, or giving phase inversion to a specific Tx signal. Moreover, a portion of an SI signal may be cancelled by utilizing multiple polarized antennas or a directional antenna.

Analog Self-IC: This is a scheme of cancelling an SI signal using an analog signal copied by a scheme of cancelling interference in an analog stage before a received signal passes through Analog-to-Digital Converter (ADC). This may be performed in an RF or IF region. A method of cancelling an SI signal is described in detail as follows. First of all, a copy signal of an actually received SI signal is generated in a manner of time-delaying a transmitted analog signal and then adjusting an amplitude and phase of the signal and then subtracted from a signal received through an RX antenna. Yet, since it is processed using the analog signal, additional distortion may occur due to implementation complexity and circuit characteristics, which is disadvantageous in that interference cancellation performance may be changed considerably.

Digital Self-IC: This is a scheme of cancelling interference after a received signal has passed through ADC and includes all interference cancellation schemes performed in a baseband region. Most simply, it can be implemented in a manner of making a copy signal of SI using a transmitted digital signal and then subtracting it from a received digital signal. Alternatively, schemes for preventing a transmitted signal of a UE or BS from being received through an Rx antenna in a manner of performing precoding/postcoding on a baseband using multiple antennas may be classified as Digital Self-IC. However, Digital Self-IC is possible if a digitally modulated signal is quantized enough to reconstruct information on a desired signal. Thus, in order to perform Digital Self-IC, it is necessary to premise condition that a signal power level difference between an interference signal, which remains after cancelling interference using at least one of the above schemes, and a desired signal should enter an ADC range.

Figure 11:
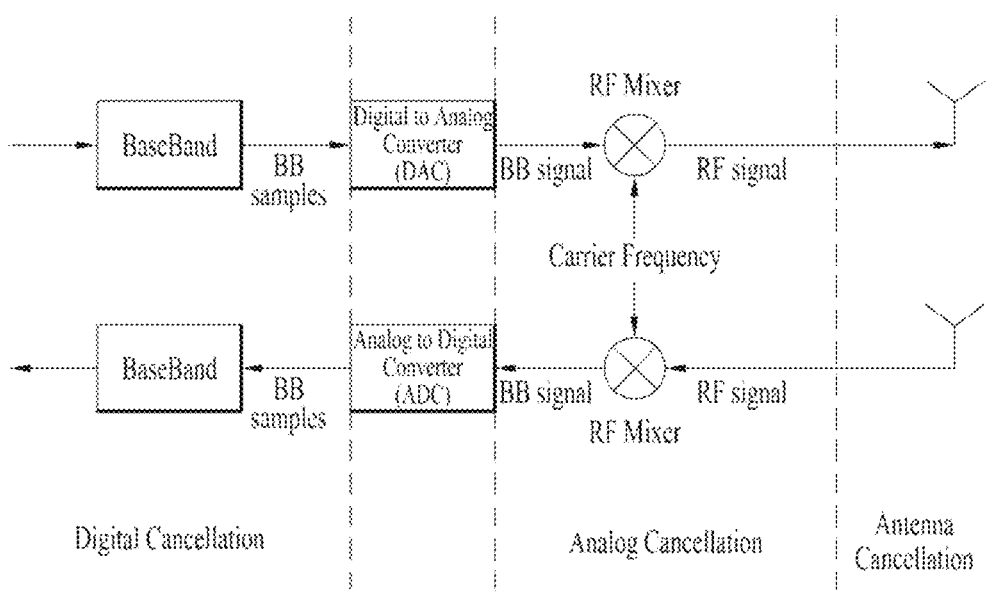
FIG. 11 is a diagram showing positions for applying there kinds of interference schemes in an RF Tx/Rx stage (or RF front end) of a device.
Figure 12:
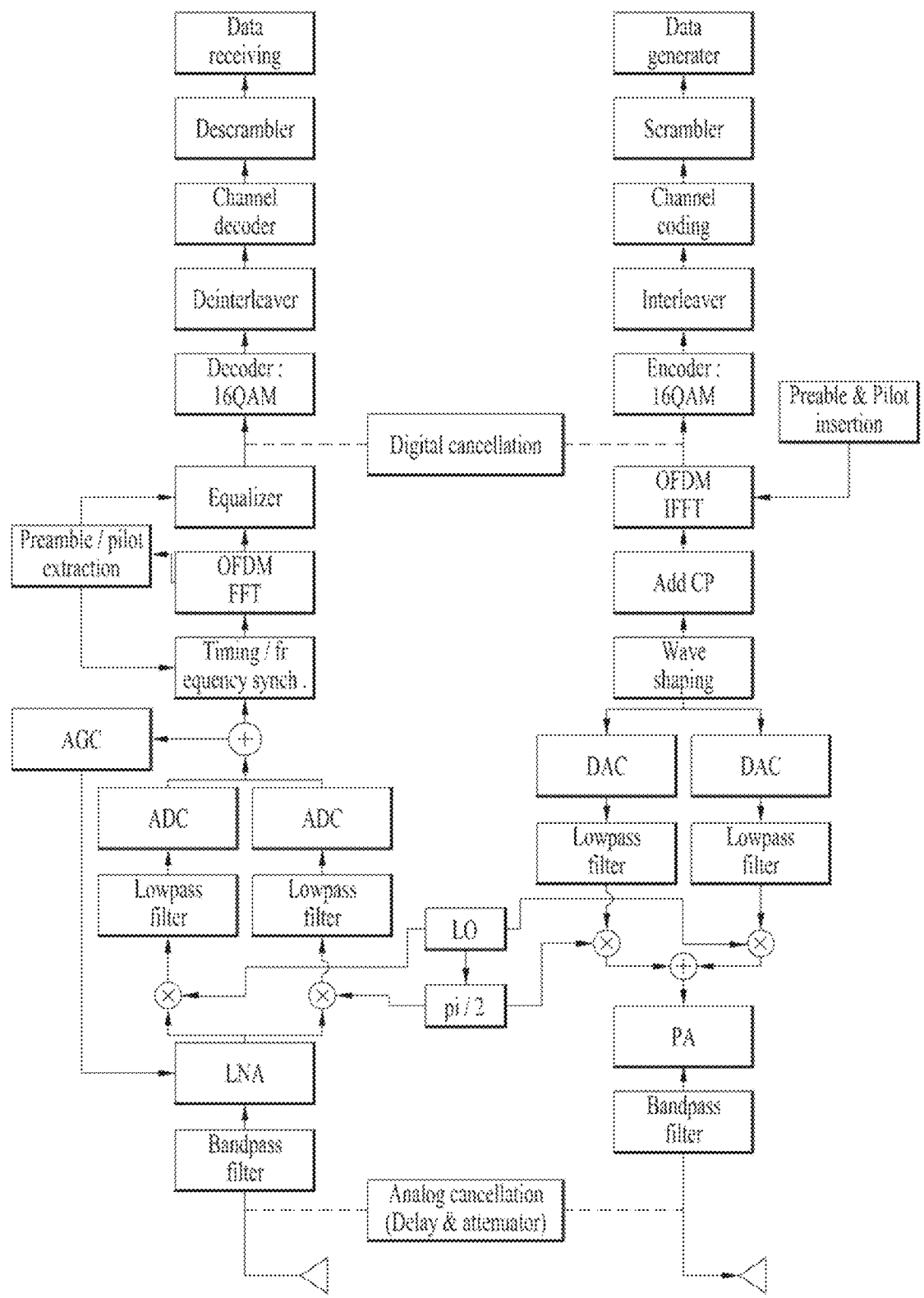
FIG. 12 is a block diagram diagrammatizing a device for Self-Interference Clearance (Self-IC) in a communication device proposed in a communication system environment using OFDM based on FIG. 11.

FIG. 12 is a block diagram diagrammatizing a device for Self-Interference Cancellation (Self-IC) in a communication device proposed in a communication system environment using OFDM based on FIG. 11.

Regarding a location of a Digital Self-IC block, although FIG. 12 shows that it is performed directly using digital SI signal information before DAC and digital SI signal information after ADC, it may be performed using a digital SI signal after IFFT and a digital SI signal before FFT. In addition, although FIG. 12 is the conceptual diagram showing that a SI signal is cancelled by separating a Tx antenna and an Rx antenna from each other, antenna configuration may be different that of FIG. 12 in case of using an antenna interference cancellation scheme using a single antenna.

Signal Modeling of FDR System

Since the FDR system uses the same frequency between the transmission (Tx) signal and the reception (Rx) signal, non-linear components in RF may greatly affect the FDR system. Specifically, the Tx signals may be distorted by non-linear characteristics of active elements such as a power amplifier (PA) of the Tx RF chain and a low noise amplifier (LNA) of the Rx RF chain, and may also be distorted by a mixer for use in the Tx/Rx RF chains. Tx signals generated by such distortion can be modeled as signals caused by high-order components. Since even-order components affects a high frequency region corresponding to several times the peripheral and intermediate (center) frequencies of the DC, the even-order components can be effectively removed using the legacy AC coupling or filtering method. However, since odd-order components are generated adjacent to the legacy intermediate frequency, they cannot be easily removed unlike even-order components. As a result, the received odd-order components may greatly affect system performance. Considering the non-linear characteristics of the odd-order components, the reception (Rx) signal to be received after the ADC of the FDR system can be expressed by the following equation 1 according to the Parallel Hammerstein (PH) model.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

In Equation 1, $x_D(n)$ is data to be received, $h_D(n)$ is a data channel experienced by the data to be received, $x_{SI}(n)$ is data that was transmitted from the system, $h_{SI,k}(n)$ is self-channel experienced by the data that was transmitted from the system, wherein, if k is '1', this means linear components, if k is an odd value of 3 or more, this means non-linear components, and 'z (n)' is Additive White Gaussian Noise (AWGN).

Figure 13:
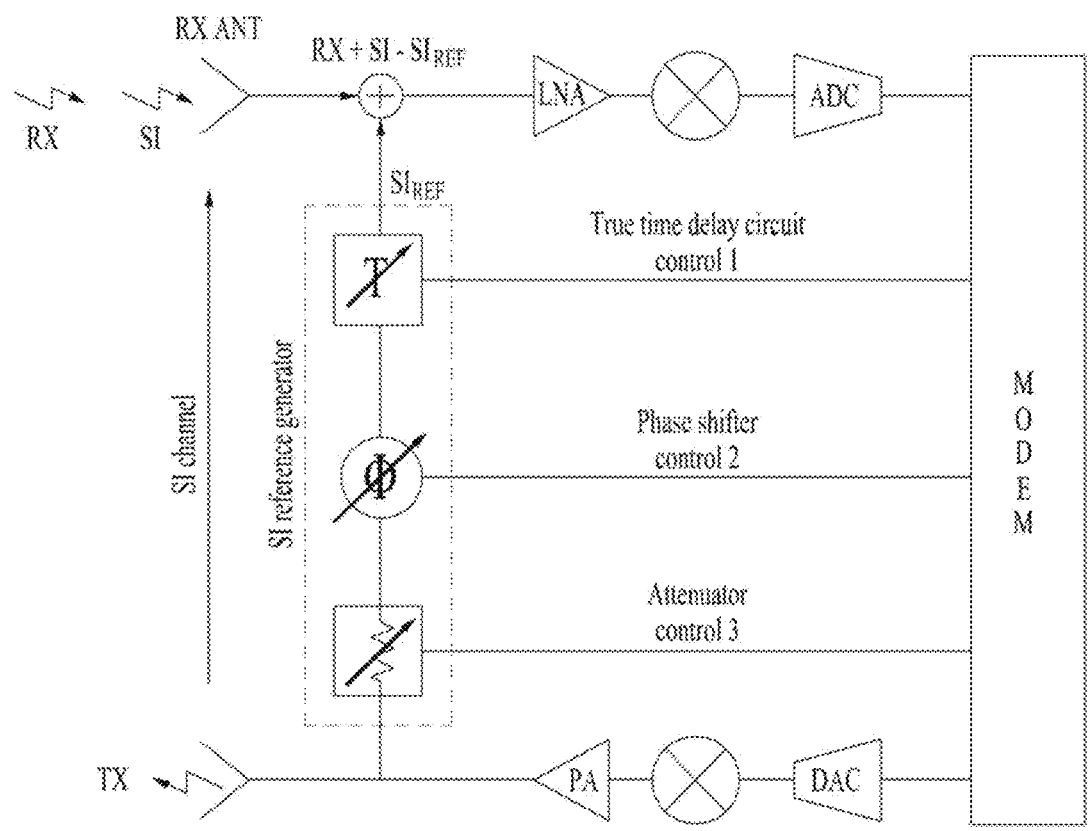
FIG. 13 is a diagram showing an RF chain of a communication device for performing general Full Duplex Radio (FDR) technology.

FIG. 13 is a diagram showing an RF chain of a communication device for performing general Full Duplex Radio (FDR) technology.

In order to cancel an SI signal in a communication device using FDR, it is necessary to generate a copy signal (hereinafter, SI interference signal) exactly identical to the SI signal. Referring to FIG. 3, for the cancellation of an SI signal, a method of subtracting an SI reference signal SIREF from an SI signal (SI) before LNA of an Rx stage of an RX chain is used in general. In this case, in order to generate the SI reference signal SIREF in the communication device, a Tx signal of a Tx stage is diverged (e.g., a case of diversion after PA in the Tx stage is shown in FIG. 3) and a portion of the Tx signal is then set to pass through an SI reference generator including an attenuator, a phase shifter and a true time delay circuit. The SI reference generator generates an SI reference signal to imitate an SI channel using the diverged Tx signal. In doing so, in order for the SI reference generator to imitate the SI channel, a channel into which the SI signal is put is estimated separately.

The communication device may estimate the SI channel and then generate a control signal inputted to the true time delay circuit, a control signal inputted to the phase shifter, and a control signal inputted to the attenuator. In this case, an SI reference signal path and a desired Rx signal should be in a state of not coming in entirely.

As a method for a communication device to control an SI reference generator, there may be two kinds of methods.

According to a first method, in order to separately estimate an SI signal incoming channel, a communication device stops communication and transmits an SI channel estimation signal (e.g., pilot signal, reference signal, etc.) on an allocated communication band (or a channel band) and an SI reference generator may imitate an SI signal upon communication using information of the SI channel estimation signal.

According to a second method, a communication device may transmit an SI signal channel estimation signal (e.g., reference signal, pilot signal, tone, etc.) carried on both ends (e.g., guard band) of a communication channel band and control an SI reference generator in a direction that the corresponding SI signal channel estimation signal is reduced according to an adaptive feedback algorithm.

In the first method, to find an optimized state of the SI reference generator, it is necessary to estimate an SI channel. To this end, a Tx device (or a Tx side) and an Rx device (or an Rx side) should stop communication as well. Moreover, even though perfect SI channel estimation is performed, it is necessary to calibrate a channel of an SI reference path very precisely. The channel of the SI reference path needs to become a lookup table based on the combination of all control voltages. Although an accurate lookup table is written with specific Tx power and temperature, it is supposed to change depending on an original Tx power and a temperature of circuit. Hence, SI signal cancellation performance is inevitably degraded due to a difference between a current Tx power and temperature and a condition at the timing of preparing the lookup table. Moreover, there is a disadvantage that it is unable to follow an SI signal channel (or an SI channel) that changes depending on a time.

Regarding the second method, as a communication device can transmit an SI signal channel estimation signal (tone, pilot signal, reference signal, etc.) carried on both communication band sides without stopping communication and controls an SI reference generator time-continuously using adaptive feedback algorithm, calibration of the SI reference generator is unnecessary. However, as the SI reference generator is controlled using a tone of a guard band on both communication band sides instead of a communication band, it is disadvantageous in that an SI signal attributed to a transmission of a tone inside the communication band, which is most important, is not cancelled.

Figure 14:
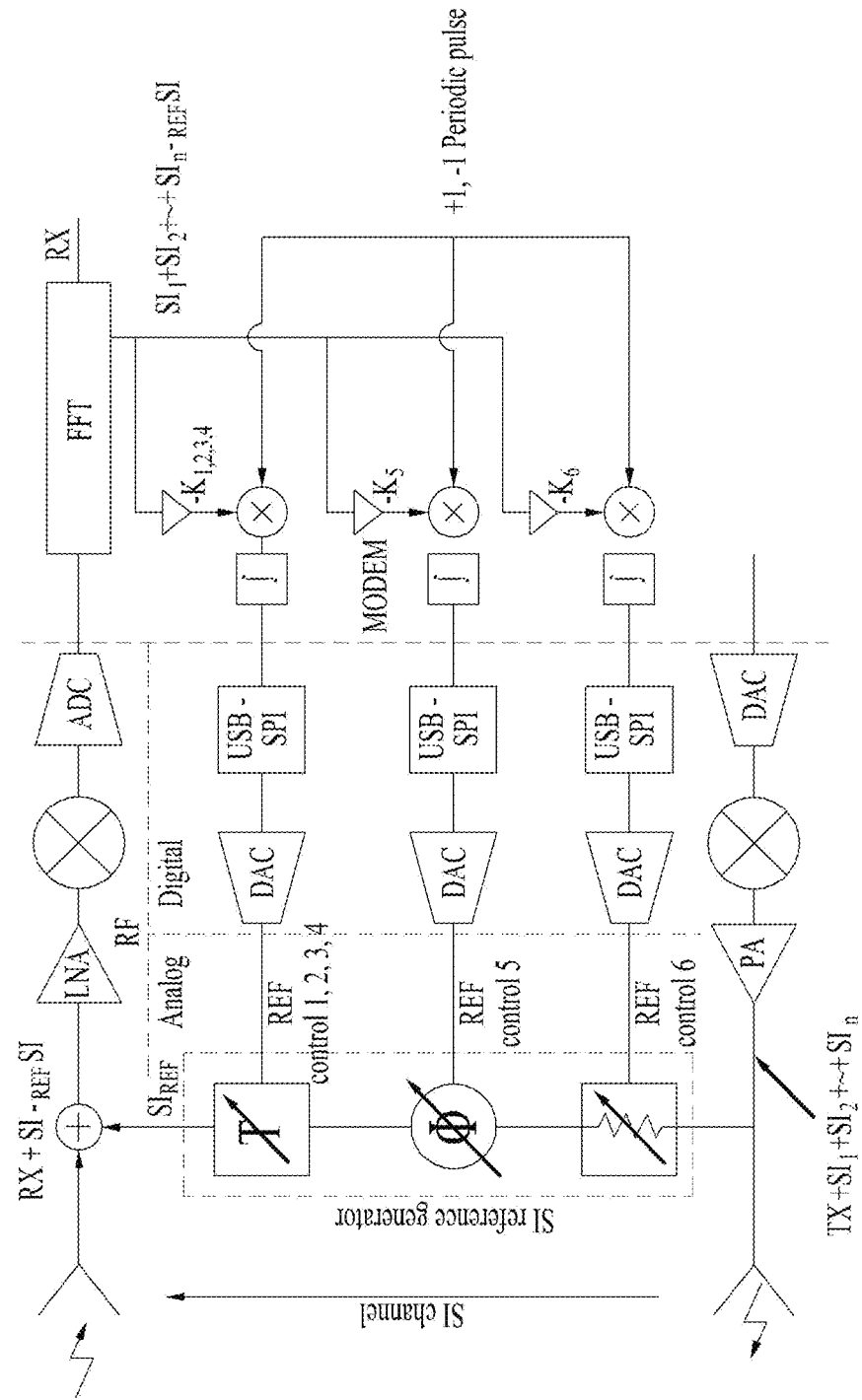
FIG. 14 is a diagram showing one example of an RF chain structure of a communication device for self-interference signal cancellation in using FDR

FIG. 14 is a diagram showing one example of an RF chain structure of a communication device for self-interference signal cancellation in using FDR.

Referring to FIG. 14, an RF chain of a communication device may include a communication modem (or a modem), an SI reference generator, a transmission (Tx) antenna, a reception (Rx) antenna, etc. The communication modem may include a Fast Fourier Transform (FFT) unit and integrators. The SI reference generator may include an attenuator, a phase shifter, and a true time delay circuit.

To generate (or copy) a fine SI reference signal, the SI reference generator may control the attenuator, the phase shifter and the true time delay circuit using an analog manner. To this end, the RF chain may include a Digital to Analog Converter (DAC) configured to convert a control signal transmitted from the communication modem (or modem) into an analog signal.

According to the concept of the true time delay circuit (true time delay) defined as a slope of phase shift to frequency band basically, as it is unable to control a true time delay with information on a single frequency only, it is necessary to obtain information on at least two frequencies in order to perform SI signal cancellation on a wide band. Therefore, it is assumed to transmit two or more pilot signals, two or more reference signals, two or more tones, or the like, which are test signals.

In order to control the SI reference generator, how to use multiple reference signals (or, multiple tones, multiple pilot signals, etc.), which are test signals, is described. First of all, the communication model (or modem) shown in FIG. 15 may monitor a sum of powers of multiple tones at the frequencies where the multiple tones are located as test signals, measure the powers at the frequency positions where the multiple tones are transmitted, respectively, and then calculate the sum of the measured powers. Here, the power measured at the frequency position of the transmitted tone corresponds to the power of the SI signal.

The communication modem may transmit a control signal to minimize a difference between the power sum of SI signals attributed to multiple tones and the power of an SI reference signal. Namely, the communication modem may feed a control signal, which is to minimize the sum of the powers of the SI signals attributed to the multiple tones, back to the SI reference generator. The SI reference generator generates an SI reference signal according to the feedback control signal. To cancel the measured power sum of the SI signals, the communication modem may generate an SI reference signal having a power of a value closest to the power sum.

The communication modem may control the SI reference generator until the power sum (SI=SI1+SI2+SI3+ . . . +SIn) is minimized using the adaptive feedback loop. Here, Sin is a power of an SI signal measured at a frequency position where an nth reference signal among a plurality of reference signals is transmitted. The communication modem uses a periodic pulse signal of +1 and −1 to change a sign of an increment of a bias voltage controlled by a loop function of adaptive feedback. The loop function means a function for searching surroundings of a current variable in a feedback loop including a variable to control.

The communication modem may feed a control signal back to each of the phase shifter, the attenuator and the true time delay circuit using an adaptive feedback loop so as to enable the SI reference generator to generate an SI reference signal having a power closest to a power sum of SI signals.

As a method of controlling SI reference signal generation according to FIG. 14 operates adaptive feedback algorithm with the power sum of multiple tones, it is advantageous in that complicated channel estimation, calibration and the like are unnecessary.

Figure 15:
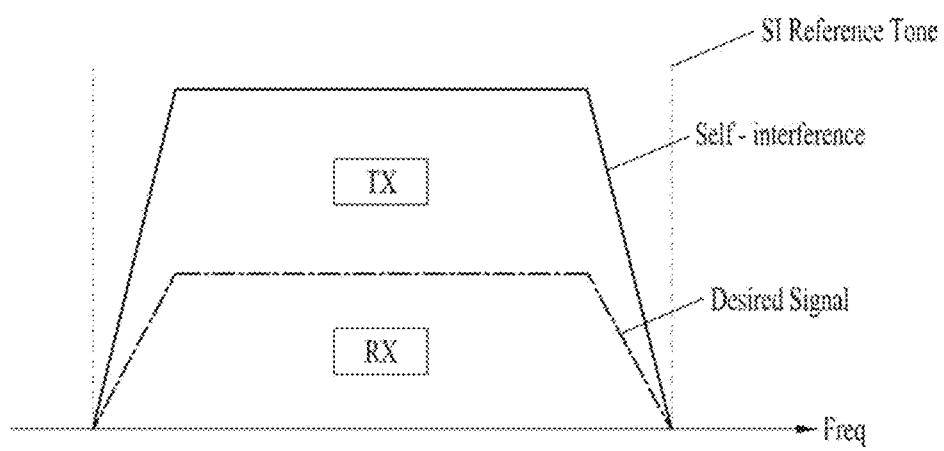
FIG. 15 is a diagram exemplarily showing two tones transmitted on both communication band sides to control a self-interference reference signal generator.

FIG. 15 is a diagram exemplarily showing two tones transmitted on both communication band sides (e.g., guard bands) to control a self-interference (SI) reference signal generator.

Referring to FIG. 15, an SI reference generator may be controlled in such a way that a (guard band) SI signal channel estimation tone is included at both ends of a communication channel band and the corresponding estimation tone is reduced according to an adaptive feedback algorithm. In this case, a desired signal from which self-interference (SI) was removed can be stably received by the system.

Meanwhile, in the related art, limited services may be performed when a gNB (base station) and a UE communicate without knowing each other's duplex mode. The gNB supports Full Duplex Radio (FDR), but if the UE does not, the UE may not be serviced due to the influence of Cross Layer Interference (CLI) from other UEs. In addition, if the gNB supports Half Duplex (HD) and the UE supports Full Duplex (FD), the UE receives only HD service, which may cause a service delay. It takes a long time for gNB and UE to know each other's duplex modes by exchanging capabilities after completion of connection between the gNB and the UE. In addition, if the capability is not right, the service delay occurs due to repeating the task of finding a gNB again and exchanging capabilities.

Therefore, for efficient services, the gNB initially indicates its serviceable duplex mode, and based on this information, a mechanism is needed for the UE to select the gNB to reduce unnecessary time. In addition, if there is no gNB that supports the duplex mode matching the UE itself, a mechanism is needed to inform the gNB of its own duplex mode so that the gNB can provide a service.

As a method for providing a service to a UE supportive of Half Duplex-Frequency Division Duplex (HD-FDD) on a network supportive of Full Duplex-Frequency Division Duplex (FD-FDD) in the existing patent "ENABLING HALF DUPLEX FREQUENCY DIVISION DUPLEX (HD-FDD) OPERATION OF USER EQUIPMENTS IN FULL DUPLEX FREQUENCY DIVISION DUPLEX (FD-FDD) NETWORK", a UE is informed whether HD-FDD is supported by adding a field to a Master Information Block (MIB) or a System Information Block (SIB), and then determined whether to connect to a network by referring to this information. However, the method proposed in this patent is missing the part about the FD-TDD network, and even if it is informed, there is no mention of an operation in case of absence of a network matching the UE.

Hereinafter, the present disclosure includes a method of supporting both Time Division Duplex (TDD) mode and FDD (Frequency Division Duplex) mode, and proposes a mechanism for enabling a smooth service if a network supporting a mode failing to match itself exists only.

A gNB indicates all duplex modes serviced by the gNB itself through a Master Information Block (MIB). A UE may select a desired gNB based on this information when searching cells. If there is no gNB that supports a desired duplex mode, the UE informs the gNB of its duplex mode to select another gNB or another Radio Access Technology (RAT) that can support the duplex mode of the UE from the gNB, thereby enabling the UE to provide a desired service in a short time. Such a method is proposed as follows.

1. When a network operates in Stand Alone (SA), a gNB informs UEs of a duplex mode provided by the gNB in a manner of adding it to an MIB.

A. Duplex modes may include HD-FDD, HD-TDD, HD-SDD (Half Duplex-Space Division Duplex), FD-FDD, FD-TDD, FD-SDD, etc.

i. (Embodiment 1) A format of an IE to be added to an MIB message may be defined as shown in Table 6 below. For example, if all five duplex modes are supported, it becomes 0x11111.

TABLE 6

| Value (5 bits) | meaning |
| --- | --- |
| 00001 | HD-FDD |
| 00010 | HD-TDD |
| 00100 | FD-FDD |
| 01000 | FD-TDD |
| 10000 | FD-SDD | ii. (Embodiment 2) A format of an IE to be added to an MIB message may be defined as shown in Table 7 or Table 8 below. In this way, the number of bits may be reduced compared to Embodiment 1.

TABLE 7

| Value (1 bit) | meaning |
| --- | --- |
| 0 | HD |
| 1 | FD |

TABLE 8

| Value (2 bits) | meaning |
| --- | --- |
| 00 | FDD |
| 01 | TDD |
| 10 | SDD |
| 11 | reserved |

2. When a network operates in Non Stand Alone (NSA) mode or when considering handover, a capability message sent by a UE is transmitted with all the duplex modes that the UE can support, so that a gNB is allowed to use this information in advance.

A. An IE to be added to a capability message may be in the form shown in Table 9 below. Several such IEs may be included.

TABLE 9

| Duplex mode (enum type) | meaning |
| --- | --- |
| 0 | HD-FDD |
| 1 | HD-TDD |
| 2 | HD-SDD |
| 3 | FD-FDD |
| 4 | FD-TDD |
| 5 | FD-SDD |

3. When searching cells, a UE may quickly search cells by selecting a gNB that supports a duplex mode matching the UE's own service using duplex mode information provided by the gNB through an MIB.

A. If there is no gNB supporting a duplex mode desired by a UE itself, any gNB may be selected randomly.

i. For example, a gNB having the highest Received Signal Strength Indicator (RSSI) may be selected.

4. After selecting a cell, a UE selects and transmits a duplex mode desired by the UE through an RRC Connection Request message.

A. Duplex modes may include HD, FD, etc.

i. (Embodiment 1) An IE to be added to an RRC Connection Request may be in the form shown in Table 10 below.

TABLE 10

| Duplex mode (enum type) | meaning |
| --- | --- |
| 0 | HD-FDD |
| 1 | HD-TDD |
| 2 | HD-SDD |
| 3 | FD-FDD |
| 4 | FD-TDD |
| 5 | FD-SDD | ii. (Embodiment 2) An IE to be added to an RRC Connection Request may have the form shown in Table 11 below. As a division duplex mode FDD/TDD/SDD is transmitted on cell search, a duplex mode HD/FD is transmitted only.

TABLE 11

| Duplex mode (enum type) | meaning |
|---|---|
| 0 | HD |
| 1 | FD |

5. A gNB having received the RRC Connection Request checks a duplex mode of a UE.

A. If the gNB supports the duplex mode of the UE, an RRC Connection Setup message is transmitted and a subsequent service is then performed.

B. If the gNB does not support the duplex mode of the UE, it is checked whether other gNBs or other RATs (e.g., 4G, 3G, etc.) support the duplex mode of the UE.

i. If there are other gNBs or other RATs serviceable, other gNB or RAT information (optional information added only if present), which is redirection information, is included in an RRC Connection Reject message and forwarded to the UE.

'Duplex mode is not supported' is explicitly stated in Reject Cause.

(Embodiment 1) A Reject Cause IE to be added to an RRC Connection Reject may be in the form shown in Table 12 below.

TABLE 12

| Reject Cause (enum type) | meaning |
|---|---|
| 0 | unknown |
| 1 | Duplex mode mismatch |
| 2 | Others |

(Embodiment 2) A Reject Cause IE to be added to an RRC Connection Reject may have the form shown in Table 13 below. The number of bits is reduced compared to Embodiment 1.

TABLE 13

| Reject Cause (1 bit) | meaning |
|---|---|
| 0 | unknown |
| 1 | Duplex mode mismatch |
| Not exist | Others | ii. If there is no serviceable gNB or other RAT, an RRC Connection Reject message may be delivered to the UE or a limited service may be provided to the UE.

For example, if the UE corresponds to HD-TDD and the gNB corresponds to FD-TDD, if the gNB is unable to provide HD-TDD service to the UE, the gNB may reject the request or provide a service of HD-TDD to the UE in a situation where a CLI exists.

iii. If gNB does not have surrounding gNBs or other RAT information, it may obtain information by requesting it to the surrounding gNBs.

6. The UE receives an RRC Connection Reject as a duplex mode cause.

A. If other gNB or RAT information is contained, start to perform cell search on the corresponding gNB or RAT.

B. If no other gNB or RAT information is contained, cell search may be attempted again by changing the duplex mode of the UE itself. Otherwise, cell search may be attempted again after elapse of a specific time.

Figure 16:
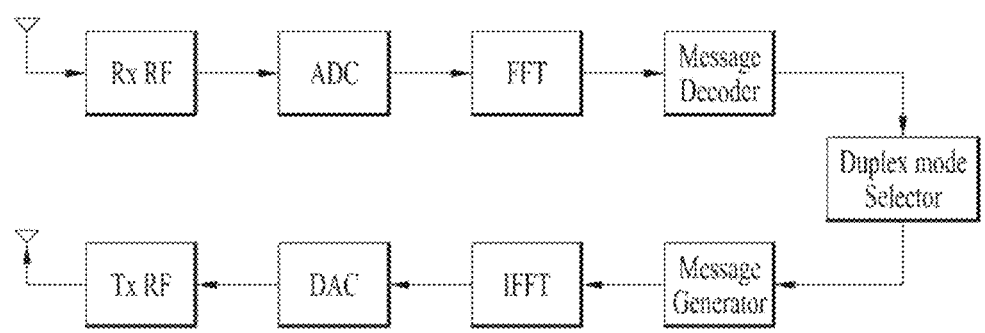
FIG. 16 is a block diagram illustrating a duplex mode selection to which the present disclosure is applicable.

FIG. 16 is a block diagram illustrating a duplex mode selection to which the present disclosure is applicable. In this case, a function block suitable for the purpose may be added or deleted.

Figure 17:
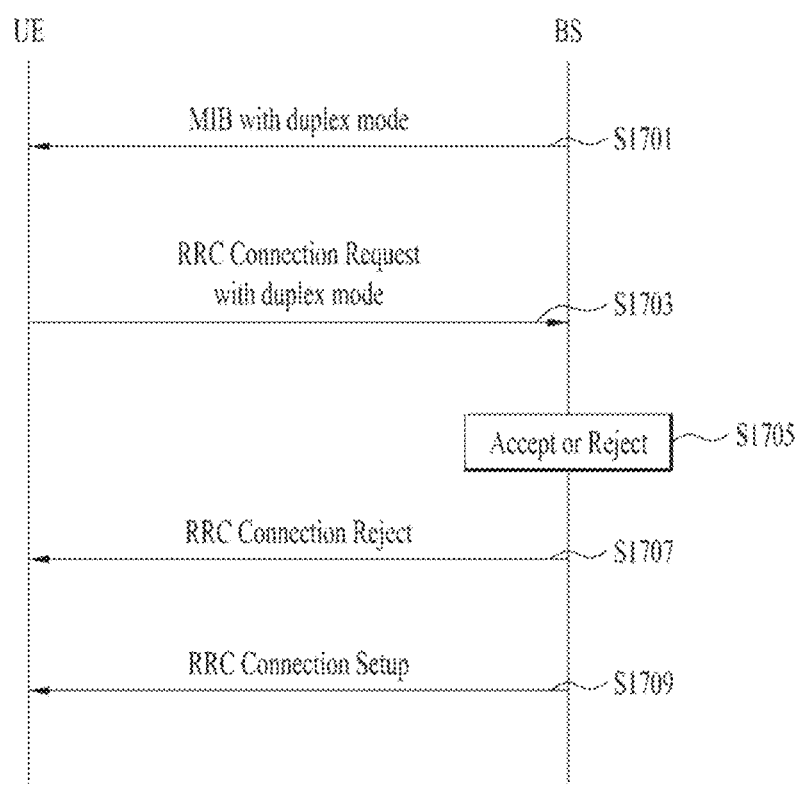
FIG. 17 is a flowchart of exchanging a duplex mode between a UE and a BS to which the present disclosure is applicable.

FIG. 17 is a flowchart of exchanging a duplex mode between a UE and a BS to which the present disclosure is applicable.

Referring to FIG. 17, an eNB transmits an MIB to a UE in a duplex mode (S1701). Thereafter, the UE transmits an RRC Connection Request to the eNB in a specific duplex mode (S1703). Upon receiving the RRC Connection Request from the UE, the eNB may accept or reject the RRC Connection, and informs the UE of it (S1705, S1707, and S1709).

Figure 18:
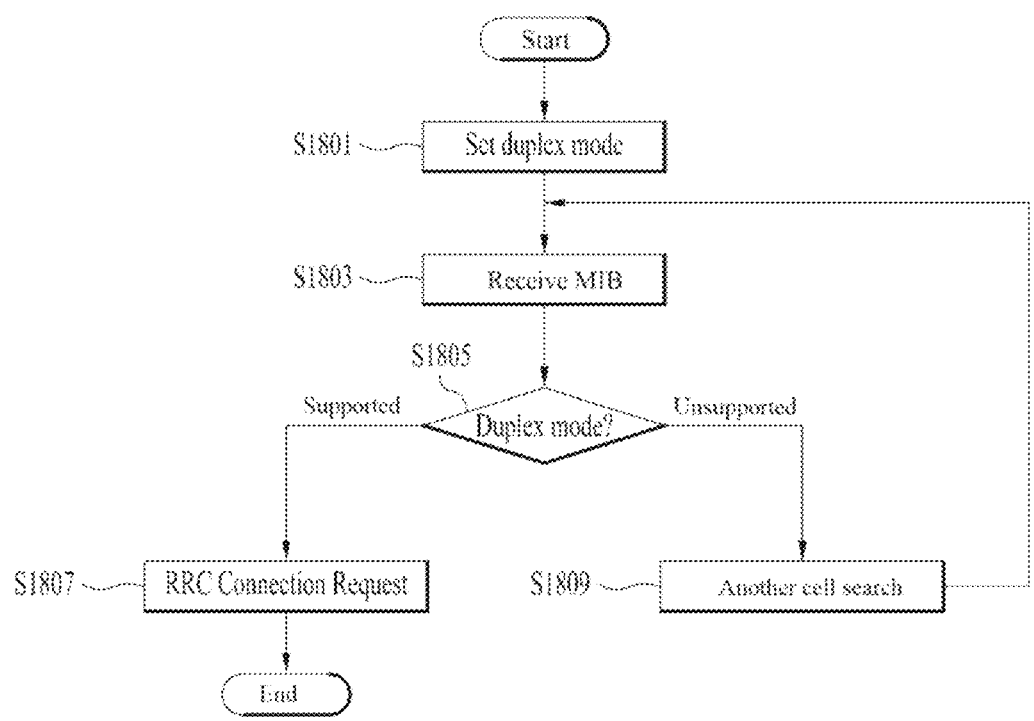
FIG. 18 is a flowchart illustrating a cell search in a UE to which the present disclosure is applicable.

FIG. 18 is a flowchart illustrating a cell search in a UE to which the present disclosure is applicable.

Referring to FIG. 18, a UE receives an MIB including information on one or more duplex modes provided by base stations from the corresponding base stations (S1803). The UE performs cell search by selecting a base station that supports a duplex mode matching a UE's own service using the duplex mode information provided by the base stations through the MIB. After selecting a cell, the UE transmits an RRC Connection Request to the base station of the selected cell (S1807). The RRC Connection Request includes information on a duplex mode desired by the UE.

If there is no base station supporting the duplex mode desired by the UE when the UE receives the MIB, the UE searches for another cell (S1809).

Figure 19:
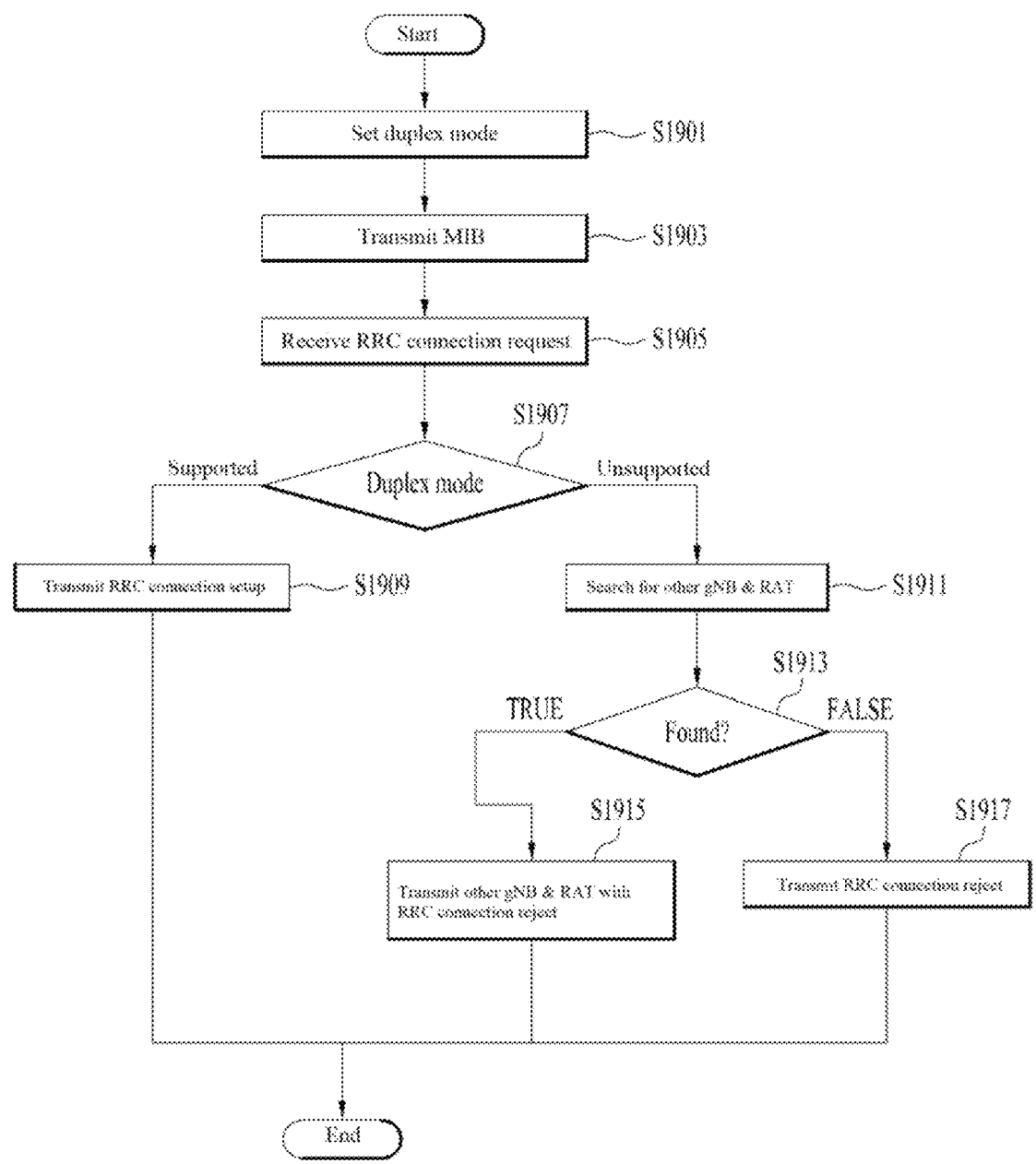
FIG. 19 is a flowchart illustrating processing a duplex mode in a BS to which the present disclosure is applicable.

FIG. 19 is a flowchart illustrating processing a duplex mode in a BS to which the present disclosure is applicable.

Referring to FIG. 19, a base station configures a duplex mode provided by the base station and informs UEs of the duplex mode in a manner that the duplex mode is included in an MIB (S1901 and S1903). Thereafter, the base station receives an RRC Connection Request from the UE (S1905), and determines whether the base station can support the duplex mode of the UE through the received RRC Connection Request (S1907).

If the base station supports the duplex mode of the UE, the base station transmits an RRC Connection Setup message to the UE to perform a subsequent service (S1909).

If the base station does not support the duplex mode of the UE, it is checked whether other surrounding base stations or other RATs support the duplex mode of the UE (S1911). If there is another serviceable base station or RAT, the base station includes information on another base station or RAT in an RRC Connection Reject message when transmitting the RRC connection Reject message to the UE (S1913). When there is no other serviceable base station or RAT, the base station transmits an RRC Connection Reject message to the UE (S1915).

The claims made in the present disclosure are as follows.

1) A method of finding an initial gNB by a UE in a situation where various duplex modes including FDR exist 2) A method for a UE to transmit its own duplex mode through an RRC Connection Request 3) A method of accepting or rejecting an RRC connection by a gNB by checking a duplex mode of a UE Through the methods and embodiments proposed in the present disclosure, a gNB initially indicates a duplex mode that the gNB can service, and based on this information, a UE selects the gNB, thereby providing efficient services by reducing unnecessary time.

Hereinafter, devices for performing the above-described proposed methods will be described in detail.

Communication System Example to which the Present Disclosure is Applied

Although not limited thereto, various descriptions, functions, procedures, proposals, methods, and/or operational flow charts of the present disclosure disclosed in this document can be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 20:
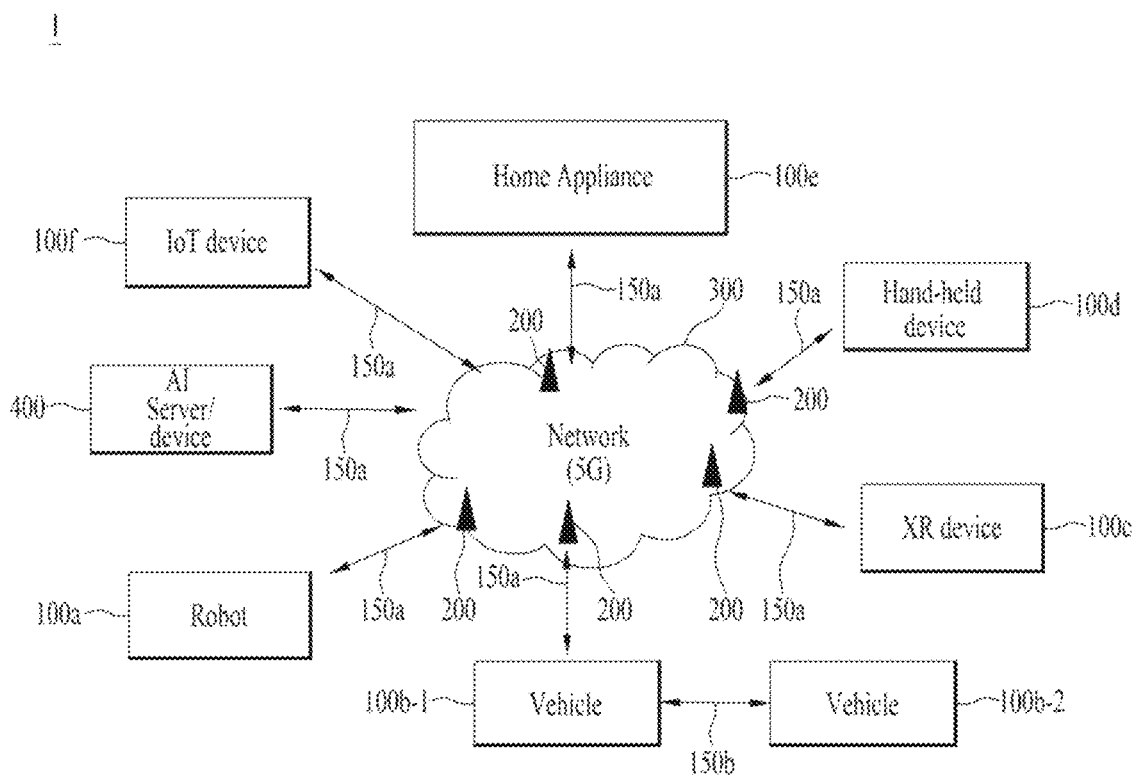
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 21:
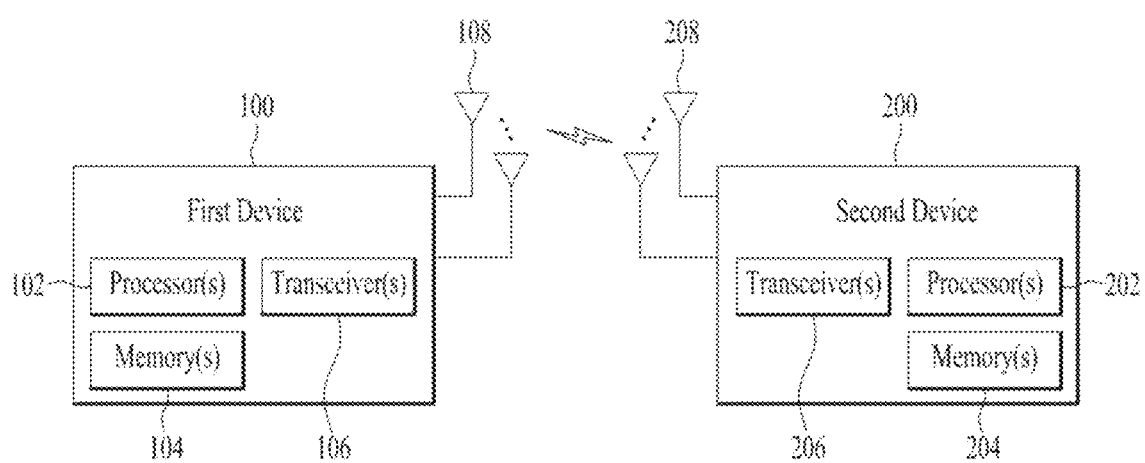
FIG. 21 illustrates wireless devices applicable to the present disclosure.

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the chipset may include the processor(s) 102 and memory(s) 104. The memory(s) 104 may include at least one program capable of performing operations related to the embodiments above described. The processor(s) 102 may receive allocation of resources related to FDR based on the at least one program stored in the memory(s) 104.

The processor(s) 102 may control the RF transceiver(s) to report SIC capability to a BS. The processor(s) 102 may control the RF transceiver(s) to receive resource allocation information on a predetermined time period divided into a first time resource period and a second time resource period from the BS. In this case, the first time resource period may be a time resource period allocated to simultaneously perform transmission of a UL signal and reception of a DL signal in the same frequency band, and the second time resource period may be a time resource period allocated to perform either the transmission of the UL signal or the reception of the DL signal. In addition, the first time resource period and the second time resource period may be determined based on the SIC capability, the amount of first data related to the UL signal, and the amount of second data related to the DL signal.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor(s) 202 of a BS may control the RF transceiver(s) to receive a report on SIC capability related to FDR from a UE. The processor(s) 202 may determine a first time resource period in which transmission of a UL signal and reception of a DL signal are simultaneously performed in the same frequency band for a predetermined time period and a second time resource period in which either the transmission of the UL signal or the reception of the DL signal is performed. The processor(s) 202 may control the RF transceiver(s) to transmit resource allocation information including information on the first time resource period and the second time resource period to the UE.

In another aspect of the present disclosure, there is provided a computer-readable storage medium having at least one computer program configured to cause at least one processor to perform operations. The operations may include: providing information on SIC capability to a BS; and receiving resource allocation information on a predetermined time period divided into a first time resource period and a second time resource period from the BS. In this case, the first time resource period may be a time resource period allocated to simultaneously perform transmission of a UL signal and reception of a DL signal in the same frequency band, and the second time resource period is a time resource period allocated to perform either the transmission of the UL signal or the reception of the DL signal. In addition, the first time resource period and the second time resource period may be determined based on the SIC capability, the amount of first data related to the UL signal, and the amount of second data related to the DL signal.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 22:
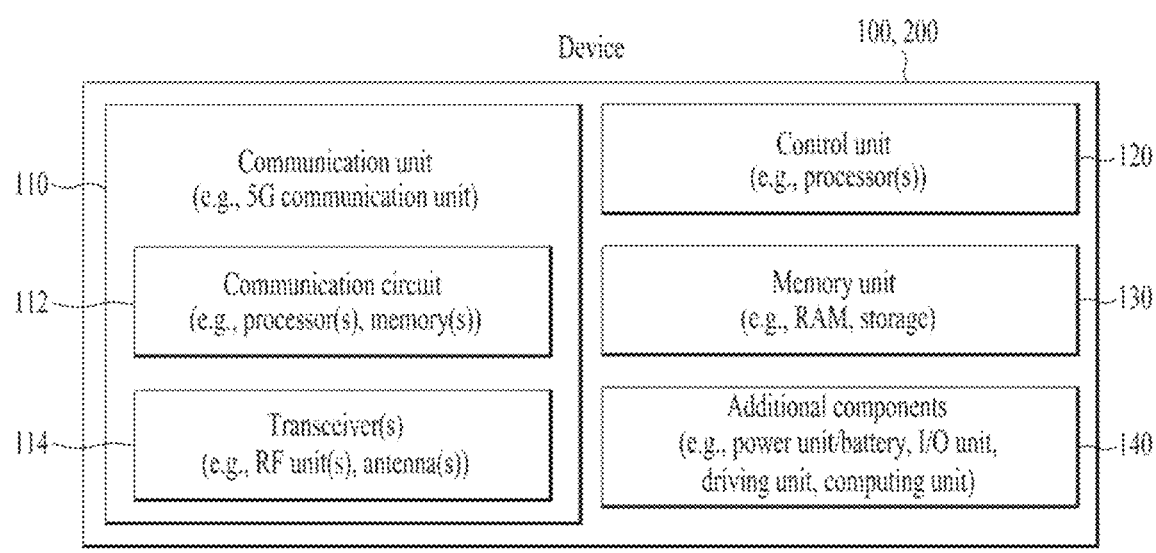
FIG. 22 illustrates another example of a wireless device to which the present disclosure is applied. The wireless device may be implemented in various forms according to use-examples/services.

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation the on of wireless device based programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Examples of Mobile Devices to which the Present Disclosure is Applied

Figure 23:
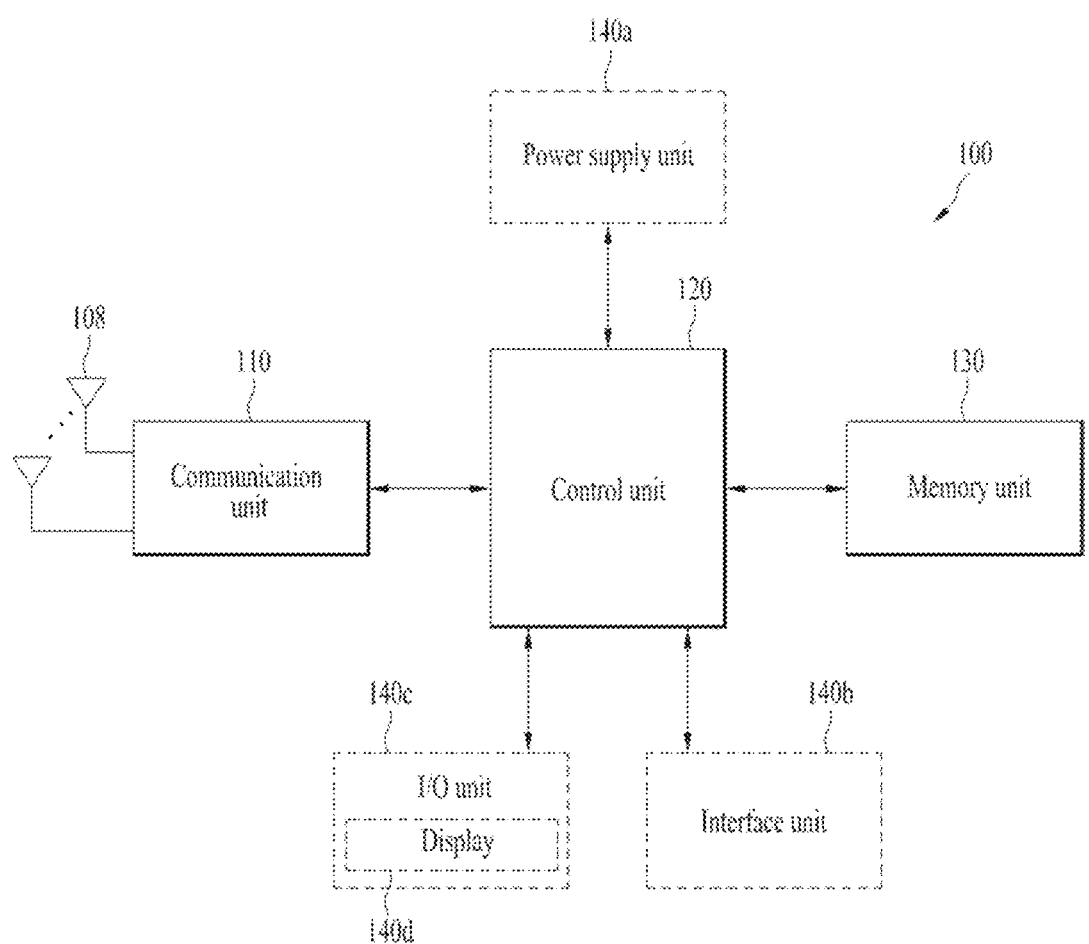
FIG. 23 illustrates a hand-held device applied to the present disclosure.

FIG. 23 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
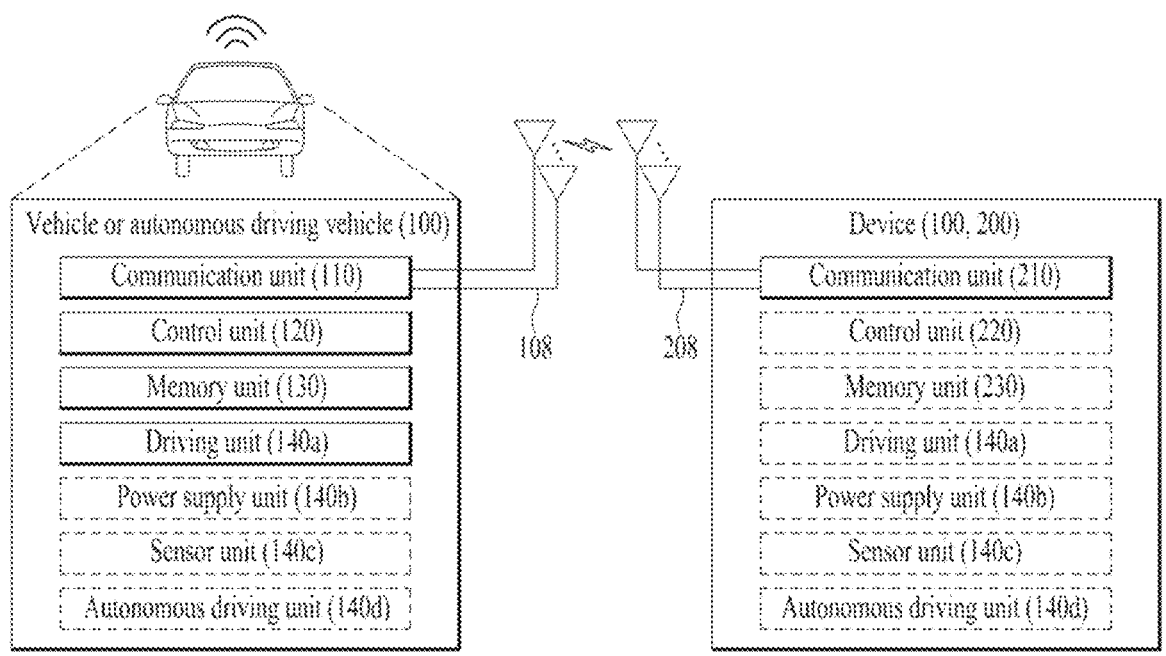
FIG. 24 illustrates a vehicle or an autonomous driving vehicle applied to the present disclosure.

Examples of Vehicles or Autonomous Vehicles to which the Present Disclosure is Applied FIG. 24 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method performed by a user equipment (UE), the method comprising:
receiving, from a base station (BS), a primary synchronization signal and a secondary synchronization signal;
acquiring synchronization with the BS and a cell identifier (ID) based on the primary synchronization signal and the secondary synchronization signal;
receiving, from the BS, a physical broadcast channel (PBCH);
obtaining a Master Information Block (MIB) based on the PBCH;
transmitting, to the BS, a Radio Resource Control (RRC) setup request message based on the MIB; and
receiving, from the BS, a response to the RRC setup request message,
wherein the MIB includes information on one or more duplex modes supported by the BS and the RRC setup request message includes information on a duplex mode supported by the UE,
wherein the information on the one or more duplex modes supported by the BS includes a bitmap, and
wherein the bitmap indicates whether a Half Duplex (HD) mode, a Full Duplex (FD), a Frequency Division Duplex (FDD) mode, a Time Division Duplex (TDD) mode, and a Space Division Duplex (SDD) mode are supported by the BS.

2. The method of claim 1, wherein the form of bitmap includes 1 bit indicating one of the HD mode and the FD mode and 2 bits indicating one of the FDD mode, the TDD mode, the SDD mode, and a reserved mode.

3. The method of claim 1, wherein the bitmap includes 5 bits corresponding to HD-FDD, HD-TDD, FD-FDD, FD-TDD, and FD-SDD, respectively.

4. The method of claim 1, further comprising determining whether the duplex mode supported by the UE exists in the one or more duplex modes supported by the BS based on the MIB,
wherein, based on a case that the duplex mode supported by the UE does not exist, the response to the RRC setup request message is an RRC reject message, and
wherein, based on a case that the duplex mode supported by the UE exists, the response to the RRC setup request message is an RRC setup message.

5. The method of claim 4, wherein the RRC reject message includes information on another BS different from the BS.

6. The method of claim 5, further comprising:
performing a cell search based on the information on the another BS.

7. The method of claim 6, further comprising:
attempting the cell search again after changing the duplex mode of the UE or waiting for a specific time.

8. A user equipment (UE) comprising:
a transceiver; and
a processor configured to:
receive, from a base station (BS), a primary synchronization signal and a secondary synchronization signal;
acquire synchronization with the BS and a cell identifier (ID) based on the primary synchronization signal and the secondary synchronization signal;
receive, from the BS, a physical broadcast channel (PBCH);
obtaining a Master Information Block (MIB) based on the PBCH:
transmit, to the BS, a Radio Resource Control (RRC) setup request message based on the MIB; and
receive, from the BS, a response to the RRC setup request message,
wherein the MIB includes information on one or more duplex modes supportable supported by the BS and the RRC setup request message includes information on a duplex mode supported by the UE,
wherein the information on the one or more duplex modes supported by the BS includes a bitmap, and
wherein the bitmap indicates whether a Half Duplex (HD) mode, a Full Duplex (FD), a Frequency Division Duplex (FDD) mode, a Time Division Duplex (TDD) mode, and a Space Division Duplex (SDD) mode are supported by the BS.

9. A method performed by a base station (BS), the method comprising:
transmitting, to a user equipment (UE), a primary synchronization signal and a secondary synchronization signal;

transmitting, to the UE, a Master Information Block (MIB) through a physical broadcast channel (PBCH);
receiving, from the UE, a Radio Resource Control (RRC) setup request message based on the MIB; and
transmitting, to the UE, a response to the RRC setup request message,
wherein the MIB includes information on one or more duplex modes supported by the BS and the RRC setup request message includes information on a duplex mode supported by the UE,
wherein the information on the one or more duplex modes supported by the BS includes a bitmap, and
wherein the bitmap indicates whether a Half Duplex (HD) mode, a Full Duplex (FD) mode, a Frequency Division Duplex (FDD) mode, a Time Division Duplex (TDD) mode, and a Space Division Duplex (SDD) mode are supported by the BS.

10. The method of claim 9,
wherein the bitmap includes 1 bit indicating one of the HD mode and the FD mode and 2 bits indicating one of the FDD mode, the TDD mode, the SDD mode, and a reserved mode.

11. A base station (BS) comprising:
a transceiver; and
a processor configured to;
transmit, to a user equipment (UE), a primary synchronization signal and a secondary synchronization signal;
transmit, to the UE, a Master Information Block (MIB) through a physical broadcast channel (PBCH);
receive, from the UE, a Radio Resource Control (RRC) setup request message based on the MIB; and
transmit, to the UE, a response to the RRC setup request message,
wherein the MIB includes information on one or more duplex modes supported by the BS and the RRC setup request message includes information on a duplex mode supported by the UE
wherein the information on the one or more duplex modes supported by the BS includes a bitmap, and
wherein the bitmap indicates whether a Half Duplex (HD) mode, a Full Duplex (FD) mode, a Frequency Division Duplex (FDD) mode, a Time Division Duplex (TDD) mode, and a Space Division Duplex (SDD) mode are supported by the BS.

12. An apparatus for a user equipment (UE), the apparatus comprising:
at least one processor; and
at least one computer memory operably connected to the at least one processor and storing instructions enabling the at least one processor to perform operations when executed, the operations comprising:
receiving, from a base station (BS), a primary synchronization signal and a secondary synchronization signal;
acquiring synchronization with the BS and a cell identifier (ID) based on the primary synchronization signal and the secondary synchronization signal;
receiving, from the BS, a physical broadcast channel (PBCH);
obtaining a Master Information Block (MIB) based on the PBCH;
transmitting, to the BS, a Radio Resource Control (RRC) setup request message based on the MIB; and
receiving, from the BS, a response to the RRC setup request message,
wherein the MIB includes information on one or more duplex modes supportable supported by the BS and the RRC setup request includes information on a duplex mode supported by the UE,
wherein the information on the one or more duplex modes supported by the BS includes a bitmap, and
wherein the bitmap indicates whether a Half Duplex (HD) mode, a Full Duplex (FD) mode, a Frequency Division Duplex (FDD) mode, a Time Division Duplex (TDD) mode, and a Space Division Duplex (SDD) mode are supported by the BS.

13. A non-transitory computer-readable storage medium storing at least one computer program including an instruction enabling at least one processor to perform an operation for a user equipment when executed by the at least one processor, the operation comprising:
receiving, from a base station (BS), a primary synchronization signal and a secondary synchronization signal;
acquiring synchronization with the BS and a cell identifier (ID) based on the primary synchronization signal and the secondary synchronization signal;
receiving, from the BS, a physical broadcast channel (PBCH);
obtaining a Master Information Block (MIB) based on the PBCH;
transmitting, to the BS, a Radio Resource Control (RRC) setup request message based on the MIB; and
receiving, from the BS, a response to the RRC setup request message,
wherein the MIB includes information on one or more duplex modes supported by the BS and the RRC setup request message includes information on a duplex mode supported by the UE
wherein the information on the one or more duplex modes supported by the BS includes a bitmap, and
wherein the bitmap indicates whether a Half Duplex (HD) mode, a Full Duplex (FD) mode, a Frequency Division Duplex (FDD) mode, a Time Division Duplex (TDD) mode, and a Space Division Duplex (SDD) mode are supported by the BS.

* * * * *